United States Patent
Wu et al.

(10) Patent No.: US 12,219,405 B2
(45) Date of Patent: Feb. 4, 2025

(54) GROUP HANDOVER METHOD AND APPARATUS

(71) Applicant: HUAWEI TECHNOLOGIES CO., LTD., Guangdong (CN)

(72) Inventors: Yedan Wu, Shanghai (CN); Tingting Geng, Shanghai (CN); Jing Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 354 days.

(21) Appl. No.: 17/886,575

(22) Filed: Aug. 12, 2022

(65) Prior Publication Data

US 2022/0394563 A1    Dec. 8, 2022

Related U.S. Application Data

(63) Continuation of application No. PCT/CN2021/076026, filed on Feb. 8, 2021.

(30) Foreign Application Priority Data

Feb. 14, 2020 (CN) .......................... 202010093671.2

(51) Int. Cl.
 *H04W 36/00* (2009.01)
(52) U.S. Cl.
 CPC ... *H04W 36/0009* (2018.08); *H04W 36/0038* (2013.01); *H04W 36/0061* (2013.01)

(58) Field of Classification Search
 CPC ......... H04W 36/0009; H04W 36/0038; H04W 36/0061; H04W 12/03; H04W 36/0066; H04W 36/00837; H04W 36/30; H04W 36/32
 See application file for complete search history.

(56) References Cited

U.S. PATENT DOCUMENTS

2006/0003771 A1   1/2006   Heino et al.
2015/0181481 A1   6/2015   Masini et al.
(Continued)

FOREIGN PATENT DOCUMENTS

CN    101754293 A    6/2010
CN    103379571 A    10/2013
(Continued)

OTHER PUBLICATIONS

Huawei, HiSilicon, Procedures for Type 1 and Type 2 Discovery Resource Allocation. 3GPP TSG RAN WG2 Meeting #85, Prague, Czech Republic, Feb. 10-14, 2014, R2-140422, 8 pages.
(Continued)

*Primary Examiner* — Hashim S Bhatti

(57) ABSTRACT

A group handover method is disclosed. The method includes: A first terminal device receives first information from a first network device, where the first information indicates a first resource for carrying fourth information, the fourth information is cell handover information of a plurality of terminal devices, and the first terminal device is one of the plurality of terminal devices; and the first terminal device receives the fourth information on the first resource. This can reduce signaling overheads caused by cell handover of a plurality of users and improve resource utilization.

18 Claims, 8 Drawing Sheets

(56) References Cited

U.S. PATENT DOCUMENTS

2015/0334609 A1* 11/2015 Waldhauser ...... H04W 36/0061
                                                       455/436
2022/0124566 A1*  4/2022 Wallentin .......... H04W 36/0094
2022/0394562 A1* 12/2022 Wang .................... H04W 36/32

FOREIGN PATENT DOCUMENTS

CN    106941701 A    7/2017
EP      2981131 A1   2/2016

OTHER PUBLICATIONS

3GPP TS 38.331 V15.8.0 (Dec. 2019), 3rd Generation Partnership Project; Technical Specification Group Radio Access Network; NR; Radio Resource Control (RRC) protocol specification(Release 15), 532 pages.

3GPP TR 38.821 V16.0.0 (Dec. 2019), 3rd Generation Partnership Project; Technical Specification Group Radio Access Network; Solutions for NR to support non-terrestrial networks (NTN)(Release 16), 140 pages.

International Search Report and Written Opinion issued in PCT/CN2021/076026, dated Apr. 29, 2021, 9 pages.

MediaTek Inc., Grouping and Automatic Reconfiguration for Handover Enhancement in LEO NTN. 3GPP TSG-RAN WG2 Meeting #106, Xi'an, China, May 13-May 17, 2019, R2-1905702, 7 pages.

Extended European Search Report issued in EP21754662.1, dated Apr. 4, 2023, 9 pages.

* cited by examiner

GROUP HANDOVER METHOD AND APPARATUS

CROSS REFERENCE TO RELATED APPLICATIONS

This application is a continuation of International Application No. PCT/CN2021/076026, filed on Feb. 8, 2021, which claims priority of Chinese Patent Application No. 202010093671.2, filed on Feb. 14, 2020. The disclosures of the aforementioned applications are hereby incorporated by reference in their entireties.

TECHNICAL FIELD

This application relates to the communication field, and more specifically, to a group handover method and an apparatus.

BACKGROUND

In a conventional handover procedure of a mobile communication system, when a terminal device is in a connected mode, mobility management of the terminal device is controlled by a network device connected to the terminal device. In other words, the network device sends a handover message to the terminal device, to indicate a cell to which the terminal device is to be handed over and how to perform handover. With development of communication technologies, a coverage area of a cell (where for example, a satellite is used as a cell of a network device or a cell using a beamforming technology) may increase exponentially. One cell serves a very large quantity of terminal devices, and a large quantity of terminal devices may need to perform cell handover at a same moment. In a conventional technology, each terminal device schedules cell handover information (for example, a handover message) by using signaling. When a large quantity of terminal devices needs to perform handover, a signaling storm is formed. When control signaling resources are limited, a handover delay or even a communication interruption is caused.

SUMMARY

This application provides a group handover method and an apparatus, to reduce signaling overheads caused by cell handover of a plurality of user equipment and improve resource utilization.

According to a first aspect, a group handover method is provided. The method may be performed by a first network device or a module (for example, a chip) configured (or used) in the first network device. The following provides descriptions by using an example in which the method is performed by the first network device.

The method includes: The first network device sends first information, where the first information indicates a first resource, the first resource is for carrying fourth information, and the fourth information is cell handover information of a plurality of terminal devices; and the first network device sends the fourth information on the first resource.

In the foregoing solution, the first resource that carries the cell handover information of the plurality of terminal devices is scheduled by using common signaling such as the first information, to reduce signaling overheads and improve resource utilization.

With reference to the first aspect, in some implementations of the first aspect, the first information is carried on a downlink control channel, and/or the fourth information is carried on a downlink shared channel.

In the foregoing solution, the first information is control information carried on the downlink control channel, and the first resource that carries the cell handover information of the plurality of terminal devices is scheduled by using one piece of common information (namely, the first information), to reduce overheads of the downlink control channel and improve utilization of the downlink control channel.

With reference to the first aspect, in some implementations of the first aspect, the fourth information is encrypted by using encryption information, and the encryption information is used by the plurality of terminal devices to detect the fourth information.

In the foregoing solution, the cell handover information (namely, the fourth information) of the plurality of terminal devices is encrypted by using the encryption information, so that a terminal device other than the plurality of terminal devices can be prevented from decoding the cell handover information, to improve security.

With reference to the first aspect, in some implementations of the first aspect, the fourth information includes common information and/or a plurality of pieces of dedicated information, the common information is cell handover information that is common to the plurality of terminal devices, the plurality of pieces of dedicated information correspond to the plurality of terminal devices, and each piece of dedicated information is cell handover information that is dedicated to the corresponding terminal device.

In the foregoing solution, the fourth information may include the cell handover information of each of the plurality of terminal devices, so that each of the plurality of terminal devices can perform cell handover based on the cell handover information of the terminal device in the fourth information. Alternatively, the fourth information may include the common information of the plurality of terminal devices and the dedicated information of each terminal device. Common parts of the cell handover information of the plurality of terminal devices are combined, to reduce information overheads and improve resource utilization. Alternatively, the fourth information may be the cell handover information that is common to the plurality of terminal devices. The cell handover information of the plurality of terminal devices is combined, to further reduce information overheads and improve resource utilization.

With reference to the first aspect, in some implementations of the first aspect, the fourth information includes a plurality of second identifiers, the plurality of second identifiers correspond to the plurality of terminal devices, the second identifier is an identifier of the corresponding terminal device in a cell of a second network device, and the cell of the second network device is a cell to which the plurality of terminal devices is to be handed over.

In the foregoing solution, the fourth information includes the identifier of each of the plurality of terminal devices in the cell of the second network device to which the terminal device needs to be handed over, so that the terminal device can obtain the identifier in the cell to which the terminal device is to be handed over.

With reference to the first aspect, in some implementations of the first aspect, the plurality of second identifiers are arranged in a preset order in the fourth information, or the fourth information further includes at least one of the following: a plurality of first identifiers, where the plurality of first identifiers correspond to the plurality of second identifiers, the plurality of second identifiers correspond to the plurality of terminal devices by using the plurality of first identifiers, and the first identifier is an identifier of the terminal device in a cell of the first network device: or a first value, where the first value is used by each of the plurality of terminal devices to calculate the second identifier.

In the foregoing solution, the terminal device may determine the second identifier of the terminal device in the fourth information based on the preset order. Alternatively, the terminal device may determine, based on the first identifier of the terminal device, that a second identifier corresponding to the first identifier is the second identifier of the terminal device. Alternatively, the terminal device may obtain the second identifier of the terminal device based on the first value in the fourth information. In this way, the terminal device can determine the second identifier of the terminal device in the fourth information.

According to a second aspect, a group handover method is provided. The method may be performed by a first network device or a module (for example, a chip) configured (or used) in the first network device. The following provides descriptions by using an example in which the method is performed by the first network device.

The method includes: The first network device sends first information, where the first information indicates a first resource, the first resource is for carrying a plurality of pieces of second information, the plurality of pieces of second information correspond to a plurality of terminal devices, each piece of second information indicates a second resource that carries third information of the corresponding terminal device, and the third information is cell handover information; and the first network device sends the cell handover information of the corresponding terminal device on each second resource.

With reference to the second aspect, in some implementations of the second aspect, the method further includes one or more of the following:

The first information is carried on a downlink control channel, the plurality of pieces of second information are carried on a downlink shared channel, or the third information is carried on a downlink shared channel.

In the foregoing solution, a conventional technology in which control information (namely, the second information) for scheduling the cell handover information of each terminal device is carried on the downlink shared channel is improved, and the resource that carries the second information of the plurality of terminal devices is scheduled by using the first information, to reduce signaling overheads of the downlink control channel, improve resource utilization of the downlink control channel, modify the conventional technology to a minimum extent, and accelerate progress of communication standardization.

With reference to the first aspect or the second aspect, in some implementations of the first aspect or the second aspect, the plurality of terminal devices belongs to a first terminal device group, and the first information includes an identifier of the first terminal device group.

In the foregoing solution, terminal devices are grouped, and the terminal devices in the same terminal device group receive the first information of the terminal device group by using the group identifier of the terminal device group to which the terminal devices belong, so that the terminal devices that receive the cell handover information by using the same piece of first information can be determined through terminal device grouping.

With reference to the first aspect or the second aspect, in some implementations of the first aspect or the second aspect, the identifier of the first terminal device group is a scrambling code sequence of information bits in the first information (for example, a scrambling code sequence used by a network device to scramble the information bit or a CRC check bit), or the identifier of the first terminal device group is carried in one indication field in the first information.

In the foregoing solution, the identifier of the first terminal device group is used as a scrambling code of the first information, so that the first information can be encrypted, a terminal device outside the first terminal device group can be prevented from receiving the first information, and the terminal device in the first terminal device group can determine, by using the identifier of the first terminal device group, that the first information is information of the first terminal device group. Alternatively, the identifier of the first terminal device group may be carried in one indication field in the first information, so that the terminal device in the first terminal device group can determine, by using the identifier of the first terminal device group that is carried in the indication field, that the first information is first information of the first terminal device group.

With reference to the first aspect or the second aspect, in some implementations of the first aspect or the second aspect, the cell handover information includes a handover condition, and the handover condition is used by the terminal device in the plurality of terminal devices to determine whether to perform cell handover.

In the foregoing solution, the cell handover information includes the handover condition, so that the terminal device can perform cell handover when the handover condition is met.

With reference to the first aspect or the second aspect, in some implementations of the first aspect or the second aspect, the handover condition includes one or more of the following:

a time condition, where the time condition indicates a time point at which the terminal device initiates the handover;

a location condition, where the location condition indicates a location at which the terminal device initiates the handover: or a first threshold, where the first threshold indicates a threshold that needs to be met by signal strength of the cell to which the terminal device is to be handed over.

In the foregoing solution, the handover condition may be one or more of the time condition, the location condition, or the first threshold that needs to be met by the signal strength of the target cell, so that the terminal device can determine, based on the handover condition, whether to perform cell handover.

With reference to the first aspect or the second aspect, in some implementations of the first aspect or the second aspect, the method further includes: The first network device sends a first message to the second network device, where the first message is for requesting to hand over the plurality of terminal devices to the cell of the second network device, the first message includes the first identifier of each of the plurality of terminal devices, and the first identifier is the identifier of the terminal device in the cell of the first network device.

In the foregoing solution, the first network device requests, by using the first message, to hand over the plurality of terminal devices to the second network device, so that signaling overheads between the first network device and the second network device can be reduced, and resource utilization can be improved.

With reference to the first aspect or the second aspect, in some implementations of the first aspect or the second aspect, the method includes: The first network device receives a second message from the second network device, where the second message indicates the plurality of second identifiers, the plurality of second identifiers correspond to the plurality of terminal devices, and the second identifier is the identifier of the corresponding terminal device in the cell of the second network device.

In the foregoing solution, the second network device notifies, by using the second message, that the plurality of terminal devices is allowed to be handed over to the cell of the second network device, so that the signaling overheads between the first network device and the second network device can be reduced, and the resource utilization can be improved.

With reference to the first aspect or the second aspect, in some implementations of the first aspect or the second aspect, the second message includes at least one of the following: the plurality of second identifiers, where the plurality of second identifiers are arranged in the preset order in the second message: the plurality of first identifiers and the plurality of second identifiers, where the plurality of first identifiers correspond to the plurality of second identifiers, the plurality of second identifiers correspond to the plurality of terminal devices by using the plurality of first identifiers, and the first identifier is the identifier of the terminal device in the cell of the first network device: the first value, where the first value is used by each of the plurality of terminal devices to calculate the second identifier: or a plurality of first values, where each of the plurality of first values is used by each of the plurality of terminal devices to calculate the second identifier.

In the foregoing solution, the second identifiers of the plurality of terminal devices may be arranged in the preset order in the second message, where the second identifiers of the plurality of terminal devices may correspond to the first identifiers of the plurality of terminal devices, or the second message includes the first value used by the terminal device to calculate the second identifier, so that the terminal device can determine the second identifier of the terminal device after the first network device transfers content in the second message to the terminal device.

With reference to the first aspect or the second aspect, in some implementations of the first aspect or the second aspect, the second message includes the handover condition, and the handover condition is used by the terminal device in the plurality of terminal devices to determine whether to perform cell handover.

In the foregoing solution, the second message includes the handover condition, so that after the first network device transfers content in the second message to the terminal device, when the handover condition is met, the terminal device can perform handover between serving cells.

With reference to the first aspect or the second aspect, in some implementations of the first aspect or the second aspect, the handover condition includes one or more of the following: the time condition, where the time condition indicates the time point at which the terminal device initiates the handover; the location condition, where the location condition indicates the location at which the terminal device initiates the handover: or the first threshold, where the first threshold indicates the threshold that needs to be met by the signal strength of the cell to which the terminal device is to be handed over.

According to a third aspect, a group handover method is provided. The method may be performed by a first terminal device or a module (for example, a chip) configured (or used) in the first terminal device. The following provides descriptions by using an example in which the method is performed by the first terminal device.

The method includes the following steps. The first terminal device receives first information from a first network device, where the first information indicates a first resource, the first resource is for carrying a plurality of pieces of second information, the plurality of pieces of second information correspond to a plurality of terminal devices, each piece of second information indicates a second resource that carries third information of the corresponding terminal device, the third information is cell handover information, and the first terminal device is one of the plurality of terminal devices. The first terminal device receives third information on a second resource indicated by a corresponding piece of second information.

With reference to the third aspect, in some implementations of the third aspect, the method further includes one or more of the following: The first information is carried on a downlink control channel, the plurality of pieces of second information are carried on a downlink shared channel, or the third information is carried on a downlink shared channel.

According to a fourth aspect, a group handover method is provided. The method may be performed by a first terminal device or a module (for example, a chip) configured (or used) in the first terminal device. The following provides descriptions by using an example in which the method is performed by the first terminal device.

The method includes: The first terminal device receives first information from a first network device, where the first information indicates a first resource, the first resource is for carrying fourth information, the fourth information is cell handover information of a plurality of terminal devices, and the first terminal device is one of the plurality of terminal devices; and the first terminal device receives the fourth information on the first resource.

With reference to the fourth aspect, in some implementations of the fourth aspect, the first information is carried on a downlink control channel, and/or the fourth information is carried on a downlink shared channel.

With reference to the fourth aspect, in some implementations of the fourth aspect, the fourth information is encrypted by using encryption information, and the encryption information is used by the plurality of terminal devices to detect the fourth information. The method further includes: The first terminal device detects the fourth information based on the encryption information.

With reference to the fourth aspect, in some implementations of the fourth aspect, the fourth information includes common information and/or a plurality of pieces of dedicated information, the common information is cell handover information that is common to the plurality of terminal devices, the plurality of pieces of dedicated information correspond to the plurality of terminal devices, and each piece of dedicated information is cell handover information that is dedicated to the corresponding terminal device.

With reference to the fourth aspect, in some implementations of the fourth aspect, the fourth information includes a plurality of second identifiers, the plurality of second identifiers correspond to the plurality of terminal devices, the second identifier is an identifier of the corresponding terminal device in a cell of a second network device, and the cell of the second network device is a cell to which the plurality of terminal devices is to be handed over.

With reference to the fourth aspect, in some implementations of the fourth aspect, the plurality of second identifiers is arranged in a preset order in the fourth information. The method further includes: The first terminal device determines a second identifier of the first terminal device in the plurality of second identifiers based on the preset order.

With reference to the fourth aspect, in some implementations of the fourth aspect, the fourth information further includes a plurality of first identifiers corresponding to the plurality of second identifiers, the plurality of second identifiers correspond to the plurality of terminal devices by using the plurality of first identifiers, and the first identifier is an identifier of the terminal device in a cell of the first network device. The method further includes: The first terminal device determines a second identifier of the first terminal device, where the second identifier of the first terminal device is a second identifier that is in the plurality of second identifiers and that corresponds to a first identifier of the first terminal device.

With reference to the fourth aspect, in some implementations of the fourth aspect, the fourth information includes a first value. The method further includes: The first terminal device obtains a second identifier of the first terminal device based on the first value, where the second identifier is an identifier of the first terminal device in a cell of a second network device, and the cell of the second network device is a cell to which the first terminal device is to be handed over.

With reference to the third aspect or the fourth aspect, in some implementations of the third aspect or the fourth aspect, the plurality of terminal devices belongs to a first terminal device group, and the first information includes an identifier of the first terminal device group.

With reference to the third aspect or the fourth aspect, in some implementations of the third aspect or the fourth aspect, the identifier of the first terminal device group is a scrambling code sequence of information bits in the first information, or the identifier of the first terminal device group is carried in one indication field in the first information.

With reference to the third aspect or the fourth aspect, in some implementations of the third aspect or the fourth aspect, the cell handover information includes a handover condition, and the handover condition is used by the terminal device in the plurality of terminal devices to determine whether to perform handover between serving cells.

With reference to the third aspect or the fourth aspect, in some implementations of the third aspect or the fourth aspect, the handover condition includes one or more of the following: a time condition, where the time condition indicates a time point at which the terminal device initiates the handover: a location condition, where the location condition indicates a location at which the terminal device initiates the handover: or a first threshold, where the first threshold indicates a threshold that needs to be met by signal strength of the cell to which the terminal device is to be handed over.

According to a fifth aspect, a group handover method is provided. The method may be performed by a second network device or a module (for example, a chip) configured (or used) in the second network device. The following provides descriptions by using an example in which the method is performed by the second network device.

The method includes: The second network device receives a first message from a first network device, where the first message is for requesting to hand over a plurality of terminal devices to a cell of the second network device, the first message includes a first identifier of each of the plurality of terminal devices, and the first identifier is an identifier of the terminal device in a cell of the first network device. The second network device determines, based on the first message, that the plurality of terminal devices need to be handed over to the cell of the second network device.

With reference to the fifth aspect, in some implementations of the fifth aspect, the method includes: The second network device sends a second message to the first network device, where the second message indicates a plurality of second identifiers, the plurality of second identifiers correspond to the plurality of terminal devices, and the second identifier is an identifier of the corresponding terminal device in the cell of the second network device.

With reference to the fifth aspect, in some implementations of the fifth aspect, the second message includes at least one of the following: the plurality of second identifiers, where the plurality of second identifiers are arranged in a preset order in the second message: a plurality of first identifiers and the plurality of second identifiers, where the plurality of first identifiers correspond to the plurality of second identifiers, the plurality of second identifiers correspond to the plurality of terminal devices by using the plurality of first identifiers, and the first identifier is the identifier of the terminal device in the cell of the first network device: a first value, where the first value is used by each of the plurality of terminal devices to calculate the second identifier: or a plurality of first values, where each of the plurality of first values is used by each of the plurality of terminal devices to calculate the second identifier.

With reference to the fifth aspect, in some implementations of the fifth aspect, the second message includes a handover condition, and the handover condition is used by the terminal device in the plurality of terminal devices to determine whether to perform cell handover.

With reference to the fifth aspect, in some implementations of the fifth aspect, the handover condition includes one or more of the following: a time condition, where the time condition indicates a time point at which the terminal device initiates the handover: a location condition, where the location condition indicates a location at which the terminal device initiates the handover: or a first threshold, where the first threshold indicates a threshold that needs to be met by signal strength of the cell to which the terminal device is to be handed over.

According to a sixth aspect, a communication apparatus for group handover is provided. The apparatus is a first network device or a module (for example, a chip) configured (or used) in the first network device.

The communication apparatus includes: a processing unit, configured to generate first information, where the first information indicates a first resource, the first resource is for carrying fourth information, and the fourth information is cell handover information of a plurality of terminal devices; and a transceiver unit, configured to send the first information.

With reference to the sixth aspect, in some implementations of the sixth aspect, the first information is carried on a downlink control channel, and/or the fourth information is carried on a downlink shared channel.

With reference to the sixth aspect, in some implementations of the sixth aspect, the fourth information is encrypted by using encryption information, and the encryption information is used by the plurality of terminal devices to detect the fourth information.

With reference to the sixth aspect, in some implementations of the sixth aspect, the fourth information includes common information and/or a plurality of pieces of dedicated information, the common information is cell handover information that is common to the plurality of terminal devices, the plurality of pieces of dedicated information correspond to the plurality of terminal devices, and each piece of dedicated information is cell handover information that is dedicated to the corresponding terminal device.

With reference to the sixth aspect, in some implementations of the sixth aspect, the fourth information includes a plurality of second identifiers, the plurality of second identifiers correspond to the plurality of terminal devices, the second identifier is an identifier of the corresponding terminal device in a cell of a second network device, and the cell of the second network is a cell to which the plurality of terminal devices is to be handed over.

With reference to the sixth aspect, in some implementations of the sixth aspect, the plurality of second identifiers is arranged in a preset order in the fourth information.

With reference to the sixth aspect, in some implementations of the sixth aspect, the fourth information further includes a plurality of first identifiers corresponding to the plurality of second identifiers, the plurality of second identifiers correspond to the plurality of terminal devices by using the plurality of first identifiers, and the first identifier is an identifier of the terminal device in a cell of the first network device.

With reference to the sixth aspect, in some implementations of the sixth aspect, the fourth information includes a first value, and the first value is used by each of the plurality of terminal devices to calculate a second identifier.

According to a seventh aspect, a communication apparatus for group handover is provided. The apparatus is a first network device or a module (for example, a chip) configured (or used) in the first network device.

The communication apparatus includes: a processing unit, configured to generate first information, where the first information indicates a first resource, the first resource is for carrying a plurality of pieces of second information, the plurality of pieces of second information corresponds to a plurality of terminal devices, each piece of second information indicates a second resource that carries third information of the corresponding terminal device, and the third information is cell handover information; and a transceiver unit, configured to send the first information.

With reference to the seventh aspect, in some implementations of the seventh aspect, one or more of the following information is included:

The first information is carried on a downlink control channel, the plurality of pieces of second information are carried on a downlink shared channel, or the third information is carried on a downlink shared channel.

With reference to the sixth aspect or the seventh aspect, in some implementations of the sixth aspect or the seventh aspect, the plurality of terminal devices belongs to a first terminal device group, and the first information includes an identifier of the first terminal device group.

With reference to the sixth aspect or the seventh aspect, in some implementations of the sixth aspect or the seventh aspect, the identifier of the first terminal device group is a scrambling code sequence of information bits in the first information, or the identifier of the first terminal device group is carried in one indication field in the first information.

With reference to the sixth aspect or the seventh aspect, in some implementations of the sixth aspect or the seventh aspect, the transceiver unit is further configured to send a first message to the second network device, where the first message is for requesting to hand over the plurality of terminal devices to the cell of the second network device, the first message includes the first identifier of each of the plurality of terminal devices, and the first identifier is the identifier of the terminal device in the cell of the first network device.

With reference to the sixth aspect or the seventh aspect, in some implementations of the sixth aspect or the seventh aspect, the transceiver unit is further configured to receive a second message from the second network device, where the second message indicates the plurality of second identifiers, the plurality of second identifiers correspond to the plurality of terminal devices, and the second identifier is the identifier of the corresponding terminal device in the cell of the second network device.

With reference to the sixth aspect or the seventh aspect, in some implementations of the sixth aspect or the seventh aspect, the second message includes at least one of the following: the plurality of second identifiers, where the plurality of second identifiers are arranged in the preset order in the second message: the plurality of first identifiers and the plurality of second identifiers, where the plurality of first identifiers correspond to the plurality of second identifiers, and the plurality of second identifiers correspond to the plurality of terminal devices by using the plurality of first identifiers, and the first identifier is the identifier of the terminal device in the cell of the first network device: or the first value, where the first value is used by each of the plurality of terminal devices to calculate the second identifier.

With reference to the sixth aspect or the seventh aspect, in some implementations of the sixth aspect or the seventh aspect, the cell handover information includes a handover condition, and the handover condition is used by the terminal device in the plurality of terminal devices to determine whether to perform cell handover.

With reference to the sixth aspect or the seventh aspect, in some implementations of the sixth aspect or the seventh aspect, the handover condition includes one or more of the following: a time condition, where the time condition indicates a time point at which the terminal device initiates the handover: a location condition, where the location condition indicates a location at which the terminal device initiates the handover: or a first threshold, where the first threshold indicates a threshold that needs to be met by signal strength of the cell to which the terminal device is to be handed over.

In an implementation, the communication apparatus in the sixth aspect or the seventh aspect is the first network device. When the communication apparatus is the first network device, the communication interface may be a transceiver or an input/output interface. Optionally, the transceiver may be a transceiver circuit. Optionally, the input/output interface may be an input/output circuit.

In another implementation, the communication apparatus is the chip or a chip system. When the communication apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to an eighth aspect, a communication apparatus for group handover is provided. The apparatus is a first terminal device or a module (for example, a chip) configured (or used) in the first terminal device.

The communication apparatus includes: a transceiver unit, configured to receive first information from a first network device, where the first information indicates a first resource, the first resource is for carrying fourth information, the fourth information is cell handover information of a plurality of terminal devices, and the communication apparatus is configured in a first terminal device in the plurality of terminal devices; and a processing unit, configured to determine the first resource based on the first information.

With reference to the eighth aspect, in some implementations of the eighth aspect, the first information is carried on a downlink control channel, and/or the fourth information is carried on a downlink shared channel.

With reference to the eighth aspect, in some implementations of the eighth aspect, the fourth information is encrypted by using encryption information, and the encryption information is used by the plurality of terminal devices to detect the fourth information. The processing unit is further configured to detect the fourth information based on the encryption information.

With reference to the eighth aspect, in some implementations of the eighth aspect, the fourth information includes common information and/or a plurality of pieces of dedicated information, the common information is cell handover information that is common to the plurality of terminal devices, the plurality of pieces of dedicated information correspond to the plurality of terminal devices, and each piece of dedicated information is cell handover information that is dedicated to the corresponding terminal device.

With reference to the eighth aspect, in some implementations of the eighth aspect, the fourth information includes a plurality of second identifiers, the plurality of second identifiers correspond to the plurality of terminal devices, and the second identifier is an identifier of the corresponding terminal device in a cell of a second network device.

With reference to the eighth aspect, in some implementations of the eighth aspect, the plurality of second identifiers is arranged in a preset order in the fourth information. The processing unit is further configured to determine a second identifier of the first terminal device in the plurality of second identifiers based on the preset order.

With reference to the eighth aspect, in some implementations of the eighth aspect, the fourth information further includes a plurality of first identifiers corresponding to the plurality of second identifiers, the plurality of second identifiers correspond to the plurality of terminal devices by using the plurality of first identifiers, and the first identifier is an identifier of the terminal device in a cell of the first network device.

The processing unit is further configured to determine a second identifier of the first terminal device, where the second identifier of the first terminal device is a second identifier that is in the plurality of second identifiers and that corresponds to a first identifier of the first terminal device.

With reference to the eighth aspect, in some implementations of the eighth aspect, the fourth information includes a first value, and the processing unit is further configured to obtain a second identifier of the first terminal device based on the first value.

According to a ninth aspect, a communication apparatus for group handover is provided. The apparatus is a first terminal device or a module (for example, a chip) configured (or used) in the first terminal device.

The communication apparatus includes: a transceiver unit, configured to receive first information from a first network device, where the first information indicates a first resource, the first resource is for carrying a plurality of pieces of second information, the plurality of pieces of second information correspond to a plurality of terminal devices, each piece of second information indicates a second resource that carries third information of the corresponding terminal device, the third information is cell handover information, and the communication apparatus is configured in the first terminal device in the plurality of terminal devices; and a processing unit, configured to determine a second resource based on second information corresponding to the first terminal device.

With reference to the ninth aspect, in some implementations of the ninth aspect, one or more of the following information is included:

The first information is carried on a downlink control channel, the plurality of pieces of second information are carried on a downlink shared channel, or the third information is carried on a downlink shared channel.

With reference to the eighth aspect or the ninth aspect, in some implementations of the eighth aspect or the ninth aspect, the plurality of terminal devices belongs to a first terminal device group, and the first information includes an identifier of the first terminal device group.

With reference to the eighth aspect or the ninth aspect, in some implementations of the eighth aspect or the ninth aspect, the identifier of the first terminal device group is a scrambling code sequence of information bits in the first information, or the identifier of the first terminal device group is carried in one indication field in the first information.

With reference to the eighth aspect or the ninth aspect, in some implementations of the eighth aspect or the ninth aspect, the cell handover information includes a handover condition, and the handover condition is used by the terminal device in the plurality of terminal devices to determine whether to perform cell handover.

With reference to the eighth aspect or the ninth aspect, in some implementations of the eighth aspect or the ninth aspect, the handover condition includes one or more of the following: a time condition, where the time condition indicates a time point at which the terminal device initiates the handover: a location condition, where the location condition indicates a location at which the terminal device initiates the handover: or a first threshold, where the first threshold indicates a threshold that needs to be met by signal strength of the cell to which the terminal device is to be handed over.

In an implementation, the communication apparatus in the eighth aspect or the ninth aspect is the first terminal device. When the communication apparatus is the first terminal device, the communication interface may be a transceiver or an input/output interface. Optionally, the transceiver may be a transceiver circuit. Optionally, the input/output interface may be an input/output circuit.

In another implementation, the communication apparatus is the chip or a chip system. When the communication apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a tenth aspect, a communication apparatus for group handover is provided. The apparatus is a second network device or a module (for example, a chip) configured (or used) in the second network device.

The communication apparatus includes: a transceiver unit, configured to receive a first message from a first network device, where the first message is for requesting to hand over a plurality of terminal devices to a cell of the second network device, the first message includes a first identifier of each of the plurality of terminal devices, and the first identifier is an identifier of the terminal device in a cell of the first network device; and a processing unit, configured to determine, based on the first message, that the plurality of terminal devices need to be handed over to the cell of the second network device.

With reference to the tenth aspect, in some implementations of the tenth aspect, the transceiver unit is further configured to send a second message to the first network device, where the second message includes a plurality of second identifiers, the plurality of second identifiers correspond to the plurality of terminal devices, and the second identifier is an identifier of the corresponding terminal device in the cell of the second network device.

With reference to the tenth aspect, in some implementations of the tenth aspect, the second message includes at least one of the following: the plurality of second identifiers, where the plurality of second identifiers are arranged in a preset order in the second message: a plurality of first identifiers and the plurality of second identifiers, where the plurality of first identifiers correspond to the plurality of second identifiers, the plurality of second identifiers correspond to the plurality of terminal devices by using the plurality of first identifiers, and the first identifier is the identifier of the terminal device in the cell of the first network device: a first value, where the first value is used by each of the plurality of terminal devices to calculate the second identifier: or a plurality of first values, where each of the plurality of first values is used by each of the plurality of terminal devices to calculate the second identifier.

With reference to the tenth aspect, in some implementations of the tenth aspect, the second message includes a handover condition, and the handover condition is used by the terminal device in the plurality of terminal devices to determine whether to perform cell handover.

With reference to the tenth aspect, in some implementations of the tenth aspect, the handover condition includes one or more of the following:

a time condition, where the time condition indicates a time point at which the terminal device initiates the handover: a location condition, where the location condition indicates a location at which the terminal device initiates the handover: or a first threshold, where the first threshold indicates a threshold that needs to be met by signal strength of the cell to which the terminal device is to be handed over.

According to an eleventh aspect, a communication system is provided. The communication system includes: a first network device, configured to send a first message to a second network device, where the first message is for requesting to hand over a plurality of terminal devices to a cell of the second network device, the first message includes a first identifier of each of the plurality of terminal devices, and the first identifier is an identifier of the terminal device in a cell of the first network device; and the second network device, configured to receive the first message from the first network device.

With reference to the eleventh aspect, in some implementations of the eleventh aspect, the second network device is further configured to send a second message to the first network device, where the second message includes a plurality of second identifiers, the plurality of second identifiers correspond to the plurality of terminal devices, and the second identifier is an identifier of the corresponding terminal device in the cell of the second network device. The first network device is further configured to receive the second message from the second network device.

With reference to the eleventh aspect, in some implementations of the eleventh aspect, the plurality of second identifiers is arranged in a preset order in the second message, or the second message further includes at least one of the following:

a plurality of first identifiers, where the plurality of first identifiers correspond to the plurality of second identifiers, the plurality of second identifiers correspond to the plurality of terminal devices by using the plurality of first identifiers, and the first identifier is the identifier of the terminal device in the cell of the first network device: or a first value, where the first value is used by each of the plurality of terminal devices to calculate the second identifier.

With reference to the eleventh aspect, in some implementations of the eleventh aspect, the second message includes a handover condition, and the handover condition is used by the terminal device in the plurality of terminal devices to determine whether to perform cell handover.

With reference to the eleventh aspect, in some implementations of the eleventh aspect, the handover condition includes one or more of the following:

a time condition, where the time condition indicates a time point at which the terminal device initiates the handover: a location condition, where the location condition indicates a location at which the terminal device initiates the handover: or a first threshold, where the first threshold indicates a threshold that needs to be met by signal strength of the cell to which the terminal device is to be handed over.

In an implementation, the communication apparatus in the eighth aspect or the ninth aspect is the second network device. When the communication apparatus is the second network device, the communication interface may be a transceiver or an input/output interface. Optionally, the transceiver may be a transceiver circuit. Optionally, the input/output interface may be an input/output circuit.

In another implementation, the communication apparatus is the chip or a chip system. When the communication apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a twelfth aspect, a processor is provided, and includes an input circuit, an output circuit, and a processing circuit. The processing circuit is configured to: receive a signal through the input circuit, and transmit a signal through the output circuit, to enable the processor to perform the method according to any one of the first aspect to the fifth aspect and the possible implementations of the first aspect to the fifth aspect.

In a specific implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a thirteenth aspect, a processing apparatus is provided, and includes a processor and a memory. The processor is configured to: read instructions stored in the memory, receive a signal through a receiver, and transmit a signal through a transmitter, to perform the method according to any one of the first aspect to the fifth aspect and the possible implementations of the first aspect to the fifth aspect.

Optionally, there are one or more processors, and there are one or more memories.

Optionally, the memory may be integrated with the processor, or the memory and the processor are disposed separately.

In a specific implementation process, the memory may be a non-transitory memory, for example, a read-only memory (ROM). The memory and the processor may be integrated into a single chip, or may be disposed in different chips. A type of the memory and a manner in which the memory and the processor are disposed are not limited in this embodiment of this application.

It should be understood that a related data exchange process, for example, sending indication information, may be a process of outputting the indication information from the processor, and receiving capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus in the thirteenth aspect may be one or more chips. The processor in the processing apparatus may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor and exist independently.

According to a fourteenth aspect, a computer program product is provided. The computer program product includes a computer program (which may also be referred to as code or instructions). When the computer program is run, a computer is enabled to perform the method according to any one of the first aspect to the fifth aspect and the possible implementations of the first aspect to the fifth aspect.

According to a fifteenth aspect, a computer-readable medium is provided. The computer-readable medium stores a computer program (which may also be referred to as code or instructions). When the computer program is run on a computer, the computer is enabled to perform the method according to any one of the first aspect to the fifth aspect and the possible implementations of the first aspect to the fifth aspect.

According to a sixteenth aspect, a communication system is provided, and the communication system includes the foregoing one or more network devices. The system may further include the foregoing one or more terminal devices.

DETAILED DESCRIPTION OF EMBODIMENTS

The following describes technical solutions in this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system or a new radio (NR) system, a vehicle-to-everything (Vehicle-to-X, V2X) system, a long term evolution-vehicle (LTE-V) system, an internet of vehicles system, a machine type communication (MTC) system, an internet of things (IoT) system, a long term evolution-machine (LTE-M) system, a machine to machine (M2M) system, and a non-terrestrial communication (NTN) system, where V2X may include vehicle to network (V2N), vehicle to vehicle (V2V), vehicle to infrastructure (V2I), vehicle to pedestrian (V2P), and the like; the NTN system may also be referred to as a satellite communication system, another future evolved communication system, or the like.

Based on a satellite altitude, namely, a satellite orbital altitude, a satellite system may be classified into a low earth orbit (LEO) satellite, a medium earth orbit (MEO) satellite, and a geostationary earth orbit (GEO) satellite (or referred to as a high earth orbit satellite). A satellite altitude of the LEO satellite ranges from about 300 kilometers (km) to 1500 km. A satellite altitude of the MEO satellite is between those of the LEO satellite and the GEO satellite. The GEO satellite has a satellite moving speed the same as the earth's rotation speed, and remains stationary relative to the ground, and a satellite altitude is about 35768 km. The satellite system may include a geostationary earth orbit (GEO) satellite or a non-geostationary earth orbit (NGEO) satellite (for example, a LEO satellite or a MEO satellite), or may include a multi-satellite network formed by a GEO satellite and an NGEO satellite.

Figure 1:
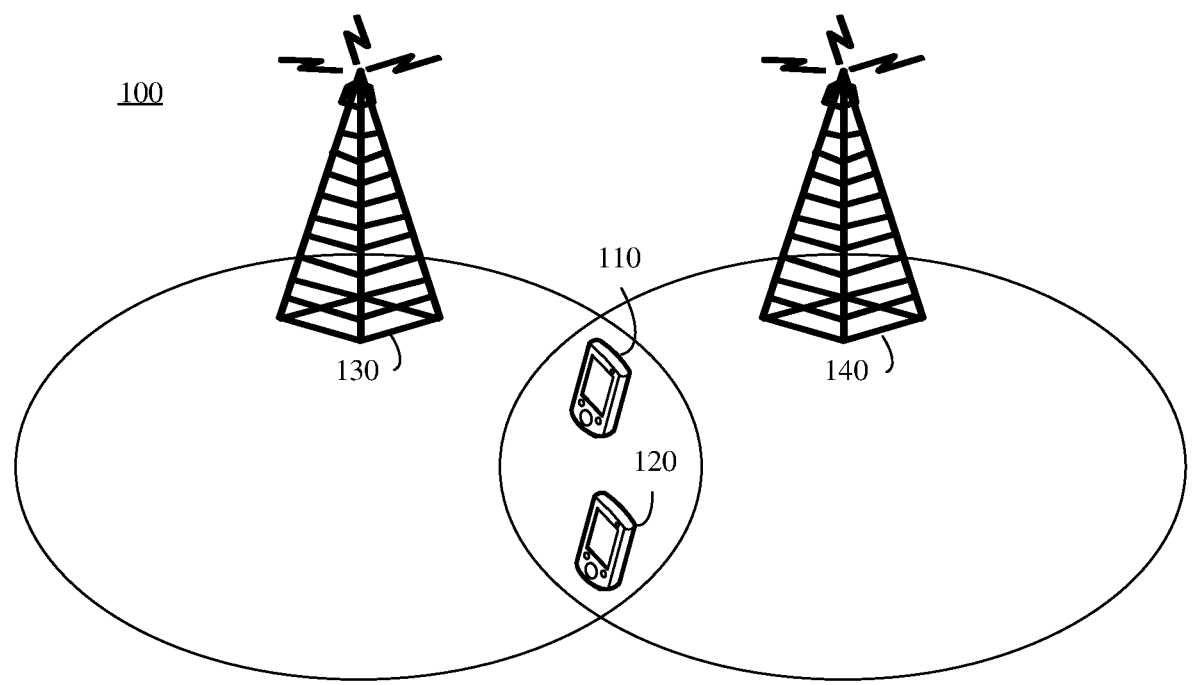
FIG. 1 is a schematic diagram of an architecture of a communication system applicable to an embodiment of this application.
Figure 2:
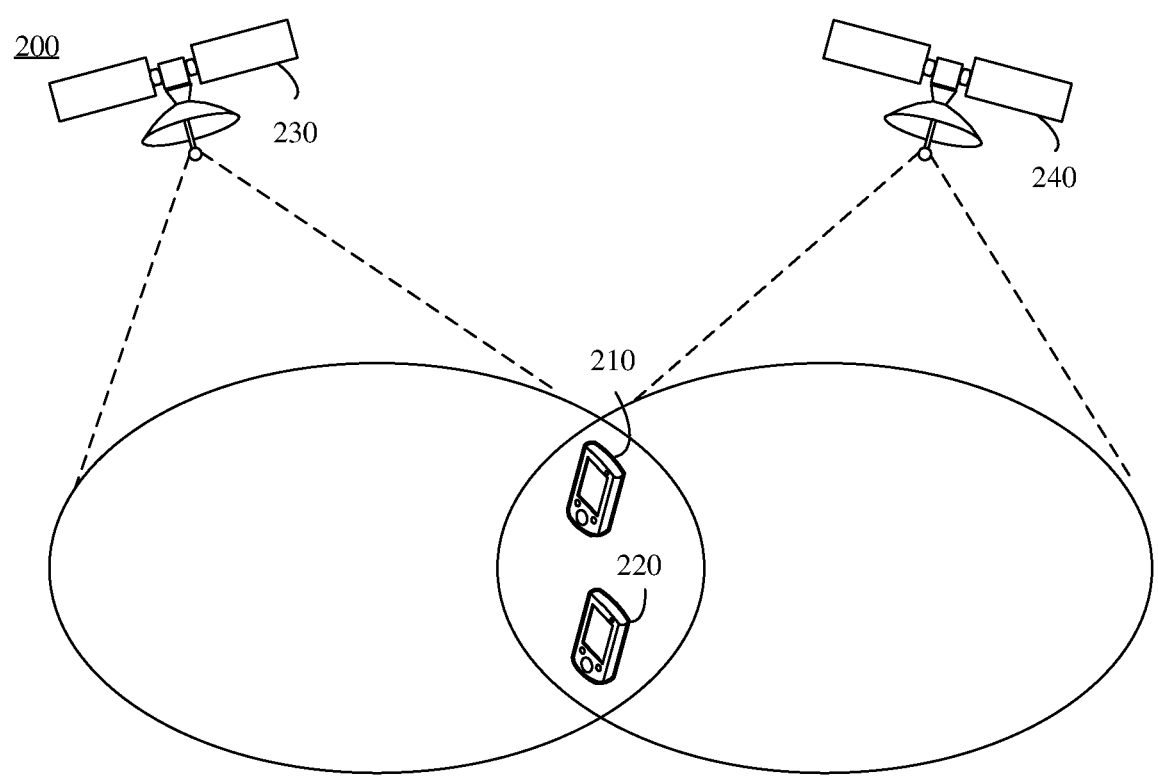
FIG. 2 is another schematic diagram of an architecture of a communication system applicable to this application.

FIG. 1 and FIG. 2 are schematic diagrams of wireless communication systems 100 and 200 applicable to embodiments of this application.

The wireless communication system applicable to an embodiment of this application may include at least two network devices. The at least two network devices may be network devices disposed on the ground, for example, network devices 130 and 140 in the wireless communication system 100 shown in FIG. 1. Alternatively, the at least two network devices may be satellites, for example, network devices 230 and 240 in the wireless communication system 200 shown in FIG. 2. Alternatively, the at least two network devices include one network device disposed on the ground and one satellite. This is not limited in this application. The wireless communication system applicable to an embodiment of this application may further include at least two terminal devices, for example, terminal devices 110 and 120 in the wireless communication system 100 shown in FIG. 1, or terminal devices 210 and 220 in the wireless communication system 200 shown in FIG. 2. The at least two terminal devices are connected to a cell of a same network device in the at least two network devices. The network device may hand over the at least two terminal devices to a cell of another network device in the at least two network devices by using a method according to an embodiment of this application.

The terminal device in embodiments of this application may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). A terminal device represented by a satellite phone or an in-vehicle satellite system may directly communicate with a satellite. A fixed terminal represented by a terrestrial communication station may communicate with a satellite only after being relayed by a ground station. A wireless transceiver antenna is mounted on the terminal device to set and obtain a communication status, to complete communication.

It should be understood that a specific form of the terminal device is not limited in this application.

The network device in embodiments of this application may be any device having a wireless transceiver function. The device includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the network device may be a gNB or a transmission point (TRP or TP) in a 5G system (for example, an NR system), one antenna panel or a group of antenna panels (including a plurality of antenna panels) of a base station in a 5G system, or a network node, for example, a baseband unit (BBU) or a distributed unit (DU), that constitutes a gNB or a transmission point.

The network device in embodiments of this application may alternatively be a satellite. The satellite may be used as a relay, to perform a radio frequency filtering and amplifying, and the like, so as to regenerate a signal. The satellite may also be used as a gNB, a DU, or a relay with a signal processing function, which is similar to an integrated access and backhaul (IAB) node.

In some deployment, the gNB may include a centralized unit (CU) and a DU. The gNB may further include an active antenna unit (AAU for short). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some processing functions of the physical layer, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or the CU may be classified into a network device in a core network (CN). This is not limited in this application.

The network device provides a communication service for a terminal device in a cell. The terminal device in the cell communicates with the network device by using a transmission resource (for example, a frequency domain resource or a time domain resource) allocated by the network device. The cell may belong to a macro base station (for example, a macro eNB or a macro gNB), or the cell may belong to a satellite.

In this application, a source network device (namely, an example of a first network device) requests to hand over a plurality of terminal devices to a cell of a target network device (namely, an example of a second network device) in one handover request, and schedules, by using same downlink control information, cell handover information of the plurality of terminal devices, to reduce signaling overheads and improve resource utilization.

Figure 3:
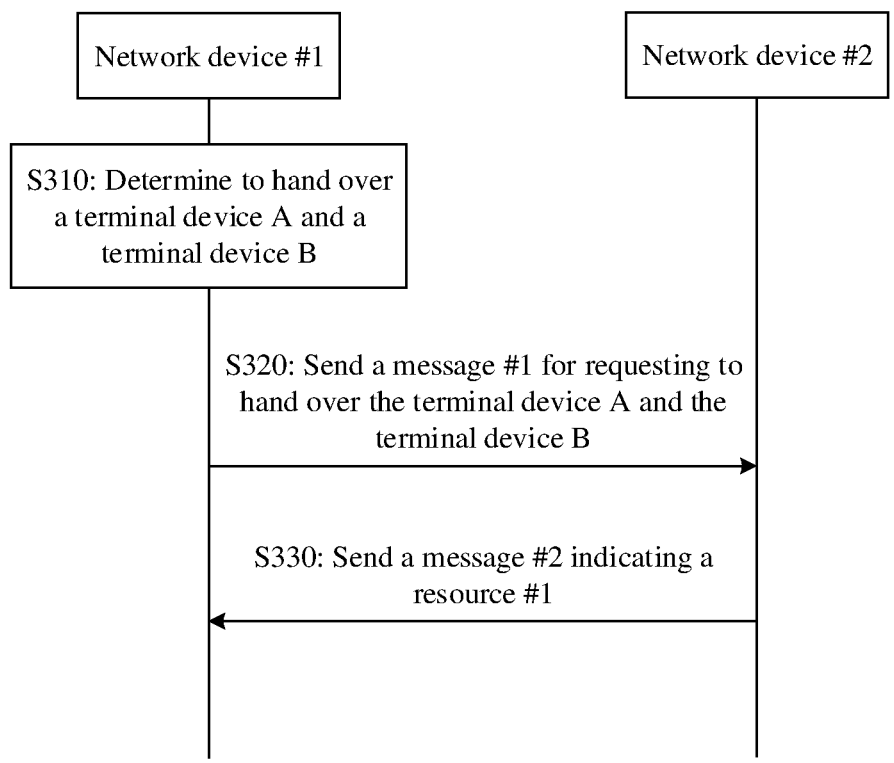
FIG. 3 is a schematic flowchart of a group handover method according to an embodiment of this application.

FIG. 3 is a schematic flowchart of a cell handover method according to an embodiment of this application.

It should be noted that, to clearly describe a solution of this application, two terminal devices, namely, a terminal device A and a terminal device B, are used as an example for description in the embodiment shown in FIG. 3. The solution of this application may be applied to a scenario in which cell handover of a plurality of terminal devices is simultaneously requested.

S310: A network device #1 (namely, an example of a first network device) determines to hand over the terminal device A and the terminal device B to a cell of a network device #2 (namely, an example of a second network device).

In an implementation, after the network device #1 groups the terminal devices based on locations of the terminal devices and/or features, for example, quantities and parameters, of data bearers of the terminal devices, the network device #1 may determine, based on a measurement report of a terminal device in a terminal device group, to hand over terminal devices in the terminal device group to the cell of the network device #2. The location of the terminal device may be an absolute geographical location (for example, geographical coordinates) of the terminal device, or a relative geographical location of the terminal device relative to the network device #1 or the network device #2. This is not limited in this application. The bearer is a channel that is for transmitting data and that is used when the terminal device is connected to the network device, and the parameters such as a capacity, a delay, and a bit error rate of the bearer are configured by the network device. If a quantity of bearers of the terminal device A is the same as that of the terminal device B, and bearer parameters of the terminal device A are respectively similar to or the same as those of the terminal device B, it may be considered that the two terminal devices have same bearer features. That bearer parameters are similar means that values of bearer parameters of a same type are less than a preset value. For example, the terminal device A has two bearers: M and N. A capacity of M is X1, a delay is Y1, and a bit error rate is Z1. A capacity of N is X2, a delay is Y2, and a bit error rate is Z2. The terminal device B has two bearers: K and L. A capacity, a delay, and a bit error rate of K are respectively similar to or the same as those of M. A capacity, a delay, and a bit error rate of L are similar to or the same as those of N. In this case, the network device #1 may consider that the terminal device A and the terminal device B have similar or same bearers (or bearer features), and group the terminal device A and the terminal device B into a same group.

For example, locations of terminal devices in a same terminal device group are the same or similar. The network device #1 groups the terminal device A and the terminal device B into a same group based on locations of the terminal device A and the terminal device B. For example, the terminal device A and the terminal device B form a terminal device group #1 (namely, an example of a first terminal device group). The network device #1 may determine the location of the terminal device based on location information reported by the terminal device.

For another example, bearer features of terminal devices in a same terminal device group are the same. For example, both the terminal device A and the terminal device B are in a call. The network device #1 groups the terminal device A and the terminal device B into a terminal device group #1 based on features of data bearers of the terminal device A and the terminal device B.

For still another example, locations of terminal devices in a same terminal device group are the same or similar, and features of data bearers are the same or similar. The network device #1 determines that locations of the terminal device A and the terminal device B are the same or similar, and features of data bearers are the same or similar. Therefore, the terminal device A and the terminal device B are grouped into a terminal device group #1 (namely, an example of a first terminal device group).

By way of an example but not a limitation, the network device #1 may determine, based on one or more measurement reports sent by one or more terminal devices in a terminal device group to the network device, to hand over terminal devices in the terminal device group to the cell of the network device #2.

For example, the network device #1 determines, based on one or more measurement reports of a part of terminal devices (for example, one terminal device or several terminal devices) in the terminal device group, to hand over the terminal devices in the terminal device group. Locations of terminal devices in one terminal device group are the same or similar. When a part of terminal devices in one terminal device group report to the network device #1 that quality of a serving cell is poor and the part of the terminal devices need to be handed over to a target cell, there is a high probability that terminal devices at similar locations in the same terminal device group have poor communication quality in the serving cell. Therefore, the network device #1 may determine, based on the one or more measurement reports of the part of the terminal devices in the terminal device group, to hand over the terminal devices in the terminal device group. For example, if a measurement report of the terminal device A in the terminal device group #1 indicates that service quality of a serving cell is poor and the terminal device A needs to be handed over to the cell of the network device #2, the network device determines to hand over the terminal device A and the terminal device B in the terminal device group #1 to the cell of the network device #2. However, this application is not limited thereto.

For another example, the network device #1 determines, based on measurement reports of all terminal devices in the terminal device group, to hand over the terminal devices in the terminal device group. For example, when a proportion of terminal devices that report poor service quality of a cell and that are in the terminal device group is greater than a threshold, the network device #1 may determine that the terminal devices in the terminal device group are to perform handover between serving cells. Alternatively, when all the terminal devices in the terminal device group report that service quality of a serving cell is poor, the network device #1 may determine that the terminal devices in the terminal device group are to perform handover between serving cells. However, this is not limited in this application.

In another implementation, the network device #1 may determine, based on measurement reports of the terminal device A and the terminal device B, to hand over the terminal device A and the terminal device B to the cell of the network device #2.

In other words, the network device #1 may not group the terminal devices. After receiving measurement reports of a plurality of terminal devices, the network device #1 determines the plurality of terminal devices to be handed over together.

For example, when the network device #1 receives the measurement reports of the plurality of terminal devices, if locations of the terminal device A and the terminal device B are the same or similar, and both the measurement reports of the terminal device A and the terminal device B indicate that quality of the cell of the network device #2 is good, the network device #1 determines to hand over the terminal device A and the terminal device B to the cell of the network device #2. However, this application is not limited thereto.

Optionally, the measurement report of the terminal device may include location information of the terminal device.

For another example, when the network device #1 receives the measurement reports of the plurality of terminal devices, if features of data bearers of the terminal device A and the terminal device B are the same or similar, and both the measurement reports of the terminal device A and the terminal device B indicate that quality of the cell of the network device #2 is good, the network device #1 determines to hand over the terminal device A and the terminal device B to the cell of the network device #2. However, this application is not limited thereto.

S320: The network device #1 sends a message #1 to the network device #2, where the message #1 is for requesting to hand over the terminal device A and the terminal device B to the cell of the network device #2.

The network device #2 receives the message #1 from the network device #1, and determines the terminal devices that need to be handed over to the cell of the network device #2. The message #1 may include an identifier #1 of each of the plurality of terminal devices that need to be handed over. In other words, the message #1 includes an identifier #1A of the terminal device A and an identifier #1B of the terminal device B. By way of an example but not a limitation, the identifier #1 is an identifier of the terminal device in a cell of the network device #1. In other words, the identifier #1A is an identifier of the terminal device A in the cell of the network device #1, and the identifier #1B is an identifier of the terminal device B in the cell of the network device #1.

Optionally, the message #1 may include a group identifier of the terminal device group including the terminal device A and the terminal device B.

Optionally, the message #1 may include indexes of the terminal device A and the terminal device B in the terminal device group including the terminal device A and the terminal device B.

By way of an example but not a limitation, the message #1 is a handover request message.

Optionally, the message #1 may further include one or more of the following:

radio resource management (RRM) configuration information, related information of a quality of service flow (QOS flow) of the terminal device, a system information block 1 (SIB1) of the network device #1, capability information of the terminal device, or measurement information reported by the terminal device.

S330: The network device #2 sends a message #2 to the network device #1, where the message #2 is for determining that the terminal device A and the terminal device B are allowed to be handed over to the cell of the network device #2.

The network device #1 receives the message #2 from the network device #2, and determines, based on the message #2, whether the network device #2 allows the terminal device A and the terminal device B to be handed over to the cell of the network device #2.

When the network device #2 determines, by using the message #2, that the terminal device A and the terminal device B are allowed to be handed over to the cell of the network device #2, the message #2 may indicate identifiers #2 of the terminal device A and the terminal device B in the cell of the network device #2. The message #2 may directly or indirectly indicate the identifiers #2 of the terminal device A and the terminal device B in the cell of the network device #2. In other words, the message #2 indicates the identifier #2 of each terminal device in the terminal device group #1. That is, the message #2 may include an information element A, and the information element A is for determining an identifier #2A of the terminal device A in the cell of the network device #2 and an identifier #2B of the terminal device B in the cell of the network device #2.

Optionally, the message #2 may include the group identifier of the terminal device group including the terminal device A and the terminal device B.

Optionally, the message #2 may include the indexes of the terminal device A and the terminal device B in the terminal device group including the terminal device A and the terminal device B.

In an implementation, the message #2 directly indicates the identifiers #2 of the terminal device A and the terminal device B in the cell of the network device #2. An arrangement order of the identifiers #2 of the terminal device A and the terminal device B in the message #2 (namely, an arrangement order in the information element A) is the same as an arrangement order of the identifiers #1 of the terminal device A and the terminal device B in the message #1. The identifier #1 is the identifier of the terminal device in the cell of the network device #1. The network device #1 determines the identifier #2A of the terminal device A and the identifier #2B of the terminal device B based on the arrangement order of the identifier #1A and the identifier #1B in the message #1. For example, the $1^{st}$ identifier #1 in the message #1 is the identifier #1A of the terminal device A, and the $2^{nd}$ identifier #1 is the identifier #1B of the terminal device B. The network device #1 may determine that the $1^{st}$ identifier #2 in the message #2 is the identifier #2A of the terminal device A, and the $2^{nd}$ identifier #2 in the message #2 is the identifier #2B of the terminal device B. However, this application is not limited thereto.

In another implementation, that the message #2 directly indicates the identifiers #2 of the terminal device A and the terminal device B in the cell of the network device #2 may be that the information element A includes the identifier #2A of the terminal device A and the identifier #2B of the terminal device B. The identifier #2A and the identifier #2B may be arranged in a preset order in the information element A, and the preset order may be that the identifiers (for example, sequence numbers) of the terminal device A and the terminal device B are arranged in descending order or in ascending order, or the identifiers (for example, sequence numbers) of the terminal device A and the terminal device B in the terminal device group #1 are arranged in descending order or ascending order. For example, a sequence number of the terminal device A in the two terminal devices is 2, a sequence number of the terminal device B in the two terminal devices is 1, and the preset order is that the sequence numbers of the terminal device A and the terminal device B are arranged in ascending order. In this case, the arrangement order of the identifier #2A and the identifier #2B in the information element A is that the identifier #2B is arranged before the identifier #2A. In other words, the identifier #2B is arranged first in the information element A, and the identifier #2A is arranged second in information element A. However, this application is not limited thereto. The network device #1 and the network device #2 may learn of the preset order or the sequence number of the terminal device in advance through information exchange, and the terminal device may learn of the preset order or the sequence number of the terminal device in advance based on an indication of the network device #1. However, this application is not limited thereto.

In another implementation, that the message #2 directly indicates the identifiers #2 of the terminal device A and the terminal device B in the cell of the network device #2 may be that the information element A includes the identifiers #1 of both of the two terminal devices, namely, the terminal device A and the terminal device B, and the identifiers #2 of both of the two terminal devices. In the information element A, two identifiers #2 correspond to two identifiers #1. That is, in the information element A, the identifier #2A corresponds to the identifier #1A, and the identifier #2B corresponds to the identifier #1B. Therefore, after receiving the information element A, the network device #1 and/or the terminal device A may determine the identifier #2A of the terminal device A in the cell of the network device #2 based on the identifier #1A of the terminal device A. In other words, the network device #1 and/or the terminal device A determine/determines, based on the identifier #2A corresponding to the identifier #1A, that the identifier #2A is the identifier of the terminal device A in the cell of the network device #2. Similarly, after receiving the information element A, the network device #1 and/or the terminal device B may determine the identifier #2B of the terminal device B in the cell of the network device #2 based on the identifier #1B of the terminal device B. In other words, the network device #1 and/or the terminal device B determine/determines, based on the identifier #2B corresponding to the identifier #1B, that the identifier #2B is the identifier of the terminal device B in the cell of the network device #2.

In another implementation, that the message #2 indirectly indicates the identifiers #2 of the terminal device A and the terminal device B in the cell of the network device #2 may be that the information element A includes a first value, where the first value is used by the terminal device A and the terminal device B to obtain their respective identifiers #2.

The first value may be an offset, and the identifier #2 of the terminal device in the cell of the network device #2 may be obtained through calculation by adding the first value and the identifier #1 of the terminal device in the cell of the network device #1. For example, the identifier #2A of the terminal device A in the cell of the network device #2 may be obtained by adding the first value and the identifier #1A of the terminal device A. Similarly, the identifier #2B may be obtained by adding the first value and the identifier #1B.

Optionally, when an identifier #2 of one terminal device obtained by using the first value is the same as an identifier of another terminal device in the cell of the network device #2, the network device #2 may send, to the network device #1, a response message for a handover request that is dedicated to the terminal device, where the response message includes an identifier #2 allocated by the network device #2 to the terminal device (where the identifier #2 is different from the identifier obtained by using the first value).

By way of an example but not a limitation, the message #2 may include two first values, and the two first values correspond to two terminal devices. In other words, the network device #2 allocates one first value to each terminal device, and the network device #1 may obtain the identifier #2 of each terminal device through calculation based on the first value corresponding to each terminal device. For example, a first value of the terminal device A is a, the network device #1 adds the identifier #1A and a to obtain the identifier #2A. A first value of the terminal device B is b, and the network device #1 adds the identifier #1B and b to obtain the identifier #2B.

By way of an example but not a limitation, the identifier #1 and/or the identifier #2 are/is a cell radio network temporary identifier (C-RNTI).

Optionally, the message #2 may further include but is not limited to one or more of the following:

an identifier of the cell (namely, a target cell to which the terminal device A and the terminal device B are handed over) of the network device #2, a group of random access resources, a correspondence between a random access resource and a synchronization message block (synchronization signal block, SSB), channel state information reference signal (CSI-RS) configuration information, or system information of the target cell.

In an implementation, the embodiment shown in FIG. 3 may be further used in conditional handover of the terminal device group. The message #1 sent by the network device #1 to the network device #2 in S320 is a conditional handover request, and is for requesting the terminal device A and the terminal device B to hand over to the cell of the network device #2 when handover conditions are met. In S330, the message #2 sent by the network device #2 to the network device #1 is a response to the conditional handover request.

Optionally, the message #2 may include an information element B, and the information element B indicates the handover conditions of the terminal device A and the terminal device B. In other words, the information element B indicates handover initiation conditions of the terminal device A and the terminal device B. The handover initiation condition may be a condition for sending a random access signal for cell handover to the network device #2 by the terminal device. However, this application is not limited thereto. The handover condition may include but is not limited to one or more of the following:

a time condition, where the time condition indicates a time point at which the terminal device initiates the handover;

a location condition, where the location condition indicates a location of the terminal device at which the terminal device initiates the handover, and the location of the terminal device may be an absolute geographical location (for example, geographical coordinates) of the terminal device, or a relative geographical location of the terminal device relative to the network device #1 or the network device #2, but this is not limited in this application: or a first threshold, where the first threshold indicates a threshold that needs to be met by signal strength of the cell to which the terminal device is to be handed over, and for example, the terminal device initiates the handover when the signal strength of the cell of the network device #2 is greater than or equal to the first threshold.

By way of an example but not a limitation, the information element B may include a second value, and the second value is a time condition for initiating the handover by the terminal device. The terminal device obtains the second value through forwarding by the network device #1, obtains, based on the second value through calculation, a time point at which the handover is initiated, and sends, at the time point at which the handover is initiated, the random access signal for accessing the cell of the network device #2.

For example, the second value is a time value. For example, the second value is measured in milliseconds. The terminal device multiplies the last digit of the identifier #1 or the identifier #2 by the second value to obtain delay time for initiating random access, and initiates the handover after the delay time. The terminal device may send the random access signal on a random access resource that arrives after the delay time.

For another example, the second value is an integer value. The terminal device may determine, based on a sum value of the integer value and a sequence number of the terminal device in the plurality of terminal devices that need to be handed over to the cell of the network device #2, a random access resource on which the random access signal is sent. For example, if the sum value is 3, the terminal device sends the random access signal in the 3rd time unit that includes the random access resource and that is after receiving of the second value.

By way of an example but not a limitation, the information element B may include a location coordinate range, and the location coordinate range may be an absolute location coordinate range, or may be a relative location coordinate range. This is not limited in this application. The terminal device obtains the coordinate range through forwarding by the network device #1. When the terminal device determines that the location of the terminal device is within the location coordinate range, the terminal device initiates the handover. The terminal device may send the random access signal on a next random access resource after the location of the terminal device is within the location coordinate range.

After receiving the message #2 and determining that the network device #2 allows the terminal device A and the terminal device B to access the cell of the network device #2, the network device #1 sends cell handover information to the terminal device A and the terminal device B.

Figure 4:
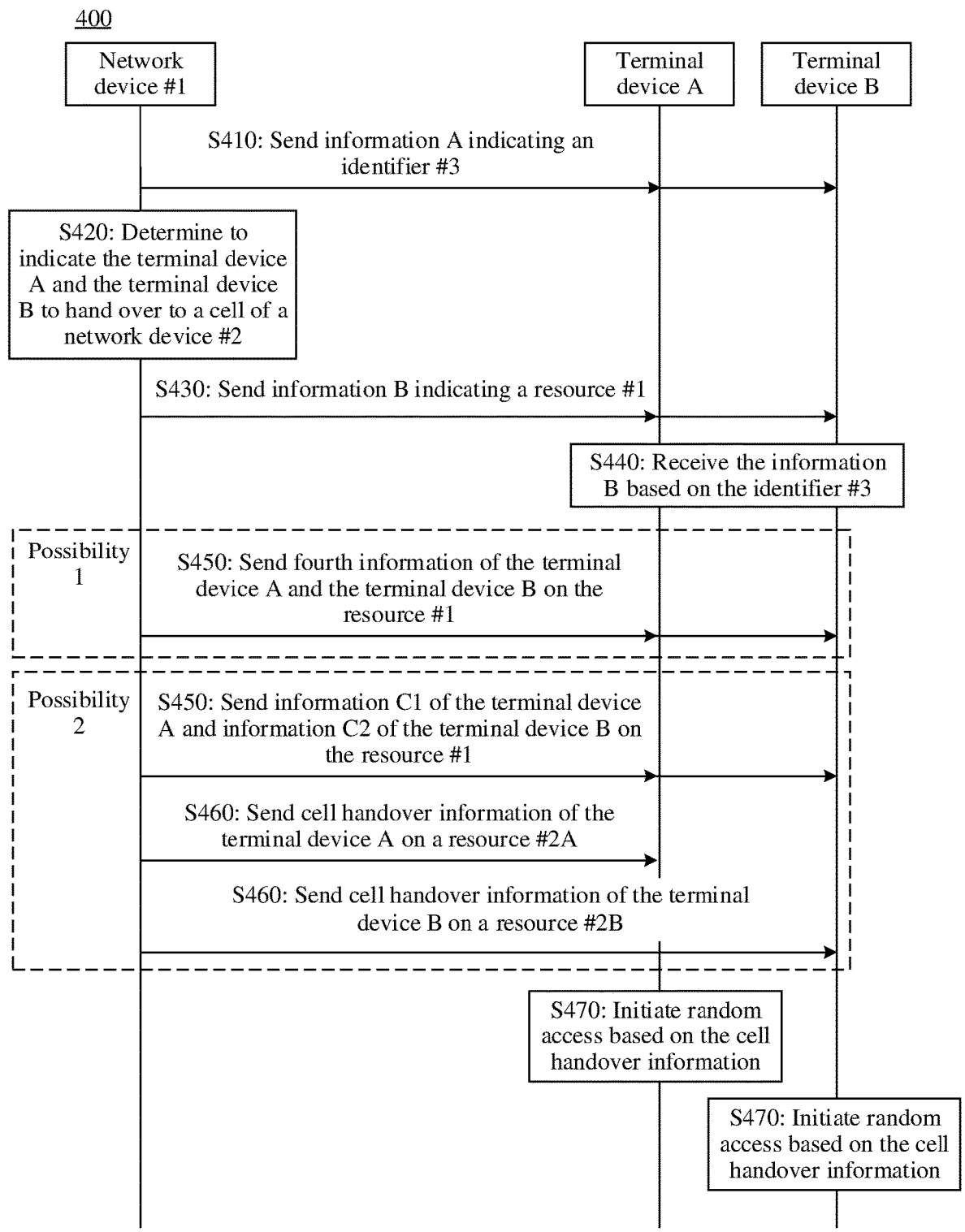
FIG. 4 is another schematic flowchart of a group handover method according to an embodiment of this application.

FIG. 4 is another schematic flowchart of a communication method according to an embodiment of this application.

It should be noted that, to clearly describe a solution of this application, two terminal devices, namely, a terminal device A and a terminal device B, are used as an example for description in the embodiment shown in FIG. 4. The solution of this application may be applied to a case of a plurality of terminal devices. For content in the embodiment in FIG. 4 that is the same as or similar to that in the embodiment in FIG. 3, refer to the foregoing descriptions of the embodiment in FIG. 3. For brevity, details are not described herein again.

S410: A network device #1 sends information A to the terminal device A and the terminal device B, where the information A indicates an identifier #3.

In an implementation, the information A may be cell common (or cell specific) information. The network device #1 notifies a grouping status of the terminal devices and a group identifier of each group by using the information A. The identifier #3 is a group identifier of a terminal device group #1 to which the terminal device A and the terminal device B belong.

For example, the information A indicates a value range of an identifier #1 of each terminal device, to group the terminal devices into one or more terminal device groups, and the identifier #1 is an identifier of the terminal device in a cell of the network device #1. The information A further includes the group identifier of each terminal device group. For example, a terminal device whose identifier #1 has a value ranging from x to y belongs to the terminal device group #1, and a terminal device whose identifier #1 has a value ranging from w to z belongs to a terminal device group #2. The identifiers #1 that are in the cell of the network device #1 (namely, a source cell of the terminal device A and the terminal device B) and whose values range from x to y include an identifier #1A of the terminal device A and an identifier #1B of the terminal device B. Therefore, the terminal device A and the terminal device B form the terminal device group #1. The terminal device A determines, based on the identifier #1A of the terminal device A in the network device #1, that the terminal device A belongs to the terminal device group #1. Therefore, the group identifier of the terminal device group to which the terminal device A belongs is the identifier #3. Similarly, the terminal device B determines, based on the identifier #1B of the terminal device B in the network device #1, that the terminal device B belongs to the terminal device group #1. Therefore, the group identifier of the terminal device group to which the terminal device B belongs is the identifier #3. The identifier #3 is used by the terminal device A and the terminal device B to receive cell handover information sent by the network device #1.

By way of an example but not a limitation, the information A may be a system message of the cell.

In another implementation, the information A is dedicated information of the terminal device. In other words, the network device #1 separately notifies the terminal device A and the terminal device B of the identifier #3. That is, that a network device #1 sends information A to the terminal device A and the terminal device B may be specifically: The network device #1 sends information A1 to the terminal device A, where the information A1 is for notifying the terminal device A of the identifier #3; and the network device #1 sends information A2 to the terminal device B, where the information A2 is for notifying the terminal device B of the identifier #3. The identifier #3 is used by the terminal device A and the terminal device B to receive cell handover information sent by the network device #1.

The terminal device A receives the information A1, and determines the identifier #3. The terminal device B receives the information A2, and determines the identifier #3.

By way of an example but not a limitation, the information A (for example, the information A1 or the information A2) may be carried in a user equipment-specific (UE-specific) radio resource control (RRC) message of the terminal device (for example, the terminal device A or the terminal device B) receiving the information A, or the information A may be carried in user equipment-specific (UE-specific) downlink control information (DCI) of the terminal device receiving the information A.

In an implementation, the network device #1 may group the terminal devices in the cell, and the identifier #3 is the group identifier of the terminal device group #1 (namely, an example of a first terminal device group) to which the terminal device A and the terminal device B belong. After determining to group the terminal devices, the network device #1 respectively sends the information A1 and the information A2 to the terminal device A and the terminal device B.

By way of an example but not a limitation, the network device #1 may group the terminal devices based on locations of the terminal devices and/or bearer features of the terminal devices.

In another implementation, when the network device #1 determines to schedule the cell handover information of the terminal device A and the terminal device B by using common scheduling information (for example, group common scheduling information, for example, information B) or same information, before sending the common scheduling information, the network device #1 respectively sends the information A1 and the information A2 to the terminal device A and the terminal device B. The terminal device A receives the information A1, and determines the identifier #3. The terminal device B receives the information A2, and determines the identifier #3. In other words, the network device #1 does not group the terminal devices in advance. After determining that the cell handover information of the terminal device A and the terminal device B needs to be scheduled by using the common scheduling information, the network device #1 notifies the terminal device A and the terminal device B of the identifier #3 for receiving the cell handover information. For example, when the embodiment in FIG. 4 is implemented in combination with the embodiment in FIG. 3, the network device #1 may respectively send the information A1 and the information A2 to the terminal device A and the terminal device B after S320. However, this application is not limited thereto.

Optionally, the information A further includes encryption information allocated by the network device #1 to the terminal device A and the terminal device B. For example, the encryption information is a key (or expressed as a secret key).

The network device #1 may allocate one key to each terminal device, that is, the network device #1 allocates one key to each of the terminal device A and the terminal device B. Alternatively, the network device #1 may allocate a same key to the terminal device A and the terminal device B, that is, the network device #1 allocates one key to the terminal device group #1. The terminal device A and the terminal device B receive the cell handover information based on the key, to improve security of the cell handover information, so that another terminal device is prevented from reading the cell handover information of the terminal device A and the terminal device B.

S420: The network device #1 determines to indicate the terminal device A and the terminal device B to hand over to a cell of a network device #2.

S430: The network device #1 sends the information B (namely, an example of first information), where the information B indicates a resource #1 (namely, an example of a first resource).

S440: The terminal device A and the terminal device B receive the information B based on the identifier #3.

The information B indicates the resource #1, and the resource #1 carries the cell handover information of the terminal device A and the terminal device B. In other words, the information B is used by the terminal device A and the terminal device B to determine the cell handover information, or the information B is used by the terminal device in the terminal device group #1 to determine the cell handover information.

In this application, a resource (for example, the resource #1, a resource #2, or a resource #3) for carrying information may be one or more of a time resource, a frequency domain resource, a code domain resource, or a space resource.

By way of an example but not a limitation, the information B may be carried on a downlink control channel (PDCCH), and/or the resource #1 is a resource on a downlink shared channel (PDSCH).

By way of an example but not a limitation, the information B includes the identifier #3, and the terminal device A and the terminal device B determine, based on the identifier #3, that the information B may be for determining the cell handover information.

In an implementation, the identifier #3 is a scrambling code sequence of information bits in the information B.

For example, the network device #1 may scramble the information bits in the information B by using the identifier #3, and the terminal device may descramble the received information B based on the identifier #3, to obtain the information bits in the information B.

For another example, the network device #1 may scramble, by using the identifier #3, a CRC check bit included in the information bits in the information B, and the terminal device descrambles the CRC check bit based on the identifier #3, to obtain the information bits in the information B.

In the foregoing solution, the identifier #3 is used as the scrambling code sequence included in the information B, to improve information security, so that a device that does not know the identifier #3 cannot descramble the information B, or a device other than the terminal device identified by the identifier #3 cannot descramble the information B, to avoid unnecessary power overheads.

In another implementation, the identifier #3 is carried in one bit field of the information B.

If the terminal device A and the terminal device B receive the information B, and the bit field in the information B carries the identifier #3, the terminal device A and the terminal device B determine that the information B may be for determining the cell handover information. If the bit field in the information B does not carry the identifier #3, the terminal device A and the terminal device B determine that the information B is not used by the terminal device A and the terminal device B to determine the cell handover information.

Based on different information carried on the resource #1, the following two possible steps may be included.
Possibility 1

S450: The network device #1 sends information C (namely, an example of fourth information) to the terminal device A and the terminal device B on the resource #1.

The information C includes the cell handover information of the terminal device A and the terminal device B. In other words, the information B in S440 indicates that the resource #1 is for carrying the cell handover information of the terminal device A and the terminal device B. The terminal device A and the terminal device B receive the cell handover information on the resource #1.

In an implementation, the information C includes common information of the terminal device A and the terminal device B, and the common information is cell handover information that is common to the terminal device A and the terminal device B. In other words, the terminal device A and the terminal device B share one piece of cell handover information.

The information C may include an information element A, and the information element A is for determining an identifier #2A of the terminal device A in the cell of the network device #2 and an identifier #2B of the terminal device B in the cell of the network device #2. The information element A may include but is not limited to the following forms:

Form 1: The information element A includes identifiers #2 of the terminal device A and the terminal device B in the cell of the network device #2, and the identifier #2A and the identifier #2B may be arranged in a preset order in the information element A.

Form 2: The information element A includes the identifier #1 of each of the two terminal devices, namely, the terminal device A and the terminal device B, and an identifier #2 of each of the two terminal devices.

Form 3: The information element A includes a first value, and the first value is for calculating identifiers #2 of the terminal device A and the terminal device B.

For a specific manner in which the terminal device determines the identifier #2 based on the information element A, refer to the descriptions in the embodiment in FIG. 3. For brevity, details are not described herein again.

Optionally, the identifier #2 of the terminal device may be encrypted by using a dedicated key allocated by the network device #1 to each terminal device. After the terminal device determines a sequence or a symbol that includes the identifier #2, the terminal device decrypts the sequence or the symbol by using the dedicated key allocated by the network device #1 to the terminal device, to obtain the identifier #2 of the terminal device. A unique key is allocated to prevent another terminal device in the group from reading the identifier #2 of the terminal device, to improve security.

Optionally, the information C is information obtained by scrambling the cell handover information of the terminal device A and the terminal device B by using a common key. In other words, the information C is information obtained by scrambling the cell handover information of the terminal device group #1 by using a group key. The common key is a key allocated by the network device #1 to the terminal device A and the terminal device B, and the group key is a key allocated by the network device #1 to the terminal device group #1 including the terminal device A and the terminal device B.

For example, the cell handover information that is common to the terminal device A and the terminal device B may be scrambled by using the common key allocated by the network device #1 to the terminal device A and the terminal device B, or the cell handover information of the terminal device group #1 may be scrambled by using the group key. The terminal device decrypts or descrambles the information C based on the common key or the group key, to obtain the cell handover information.

This can prevent a terminal device in another terminal device group from obtaining the cell handover information of the terminal device A and the terminal device B, to improve information security.

Optionally, the network device #1 performs integrity protection on the common cell handover information. The common cell handover information that is obtained through the integrity protection can be correctly received only by the terminal device A and the terminal device B, and cannot be correctly received by a device other than the terminal device A and the terminal device B. The network device #1 may notify the terminal device A and the terminal device B of an algorithm of the integrity protection in advance.

By way of an example but not a limitation, the information C may be carried in an RRC reconfiguration message.

In another implementation, the information C includes two pieces of dedicated information, and the two pieces of dedicated information respectively correspond to the terminal device A and the terminal device B. The dedicated information of the terminal device A is the cell handover information of the terminal device A, and the dedicated information of the terminal device B is the cell handover information of the terminal device B. The cell handover information of the terminal device A and the cell handover information of the terminal device B are carried on the resource #1 in one or more modes of code division multiplexing, frequency division multiplexing, or time division multiplexing.

For example, the cell handover information of the terminal device A and the terminal device B is carried on the resource #1 in the code division multiplexing mode. The terminal device A receives a symbol on the resource #1, and multiplies the symbol by an orthogonal code allocated to the terminal device A to obtain a symbol including the cell handover information of the terminal device A. Similarly, the terminal device B may obtain, by using an orthogonal code allocated to the terminal device B, the cell handover information of the terminal device B.

Optionally, the orthogonal code of the terminal device may be a key allocated by the network device #1 to the terminal device. The terminal device performs decoding based on the allocated key, to obtain the cell handover information.

For another example, the cell handover information of the terminal device A and the terminal device B is carried on the resource #1 in the frequency division multiplexing mode, and the cell handover information of each terminal device is mapped to a different frequency band resource of the resource #1 according to a predefined rule. The terminal device determines, according to the predefined rule, that the cell handover information of the terminal device is carried on the resource #1.

Optionally, cell handover information of each terminal device is scrambled by using a key allocated by the network device #1 to the terminal device, to improve confidentiality, so that another terminal device is prevented from obtaining the cell handover information that is dedicated to the terminal device.

In another implementation, the information C includes both common information and two pieces of dedicated information, and the common information is cell handover information that is common to the terminal device A and the terminal device B. Each piece of dedicated information is cell handover information that is dedicated to the corresponding terminal device.

For example, the common information may include but is not limited to an identifier (target cell ID) of a target cell and/or a system message of the target cell. The dedicated information may include an identifier #2, user equipment-specific CSI-RS configuration information, and/or the like of the corresponding terminal device. However, this application is not limited thereto.

By way of an example but not a limitation, the information C may further include an information element B. The information element B indicates handover conditions of the terminal device A and the terminal device B. The information element B may be separately included in the dedicated information of each terminal device or the common information of the terminal device. This is not limited in this application. In other words, the information element B indicates handover initiation conditions of the terminal device A and the terminal device B. The handover initiation condition may be a condition for sending a random access signal for cell handover to the network device #2 by the terminal device. However, this application is not limited thereto. The handover condition may include but is not limited to one or more of the following:

a time condition, where the time condition indicates a time point at which the terminal device initiates the handover;

a location condition, where the location condition indicates a location at which the terminal device initiates the handover; or a first threshold, where the first threshold indicates a threshold that needs to be met by signal strength of the cell to which the terminal device is to be handed over, and for example, the terminal device initiates the handover when the signal strength of the cell of the network device #2 is greater than or equal to the first threshold.

For a specific implementation of the information element B, refer to the descriptions in FIG. 3. For brevity, details are not described herein again.

Optionally, the terminal device A and the terminal device B may have a same handover condition or different handover conditions. This is not limited in this application.

Optionally, the information C may further include handover information of a plurality of target cells. In other words, the information C may include information about the cell of the network device #2 and a handover condition for handing over to the cell, and may further include information about a cell of a network device #3 and a handover condition for handing over to the cell. When the terminal device meets a handover condition of one cell, the terminal device initiates handover, to hand over to the cell that meets the handover condition.

In the foregoing solution, the first resource that carries the cell handover information of the plurality of terminal devices is scheduled by using common signaling such as the first information, to reduce signaling overheads and improve resource utilization.

Possibility 2

S450: The network device #1 sends two pieces of information D (namely, an example of second information) on the resource #1, where the two pieces of information D are in a one-to-one correspondence with the terminal device A and the terminal device B.

The terminal device A receives the information D of the terminal device A on the resource #1, and the information D is denoted as information D1. The terminal device B receives the information D of the terminal device B on the resource #1, and the information D is denoted as information D2. The information D may include an identifier of the terminal device corresponding to the information D. For example, the information D may include an identifier #1 of the terminal device corresponding to the information D, or an identifier or a sequence number of the terminal device in the terminal device group or the plurality of terminal devices. The terminal device may determine, based on the identifier of the terminal device, the information D corresponding to the terminal device, so that another terminal device cannot decode the information D of the terminal device.

The information D indicates the resource #2, and the resource #2 is for carrying the cell handover information of the terminal device corresponding to the information D. For example, the resource #2 indicated by the information D1 of the terminal device A may be denoted as a resource #2A, and is for carrying the cell handover information of the terminal device A. The resource #2 indicated by the information D2 of the terminal device B may be denoted as a resource #2B, and is for carrying the cell handover information of the terminal device B.

In the foregoing solution, control information (namely, the second information) for scheduling the cell handover information of each terminal device is carried on a downlink shared channel, and the resource for carrying the second information of the plurality of terminal devices is scheduled by using the first information, to reduce signaling overheads of the downlink control channel, improve resource utilization of the downlink control channel, reduce a workload of modifying a conventional technology (different from the possibility 1 in which the information C that carries the cell handover information is encrypted and decrypted by using the common key, in the solution in the possibility 2, an existing encryption and decryption mechanism may be used for the cell handover information, and additional encryption and decryption may not be performed on the information D, so that introduction of a new encryption and decryption mechanism (for example, encryption and decryption performed by using the key (also referred to as the common key) of the terminal device group) can be avoided. Because the encryption and decryption mechanism relate to modification of an underlying algorithm, this solution requires few changes to an existing communication system), and accelerate progress of communication standardization. In addition, in this solution, an excessively large message does not need to be sent, decoding difficulty is reduced, and decoding robustness is improved. When channel quality is poor, the terminal device can still correctly perform decoding to obtain a handover command.

S460: The network device #1 sends the cell handover information of the terminal device A on the resource #2A, and sends the cell handover information of the terminal device B on the resource #2B.

S470: The terminal device A initiates random access based on the cell handover information of the terminal device A, and the terminal device B initiates random access based on the cell handover information of the terminal device B.

After receiving the cell handover information of the terminal device A on the resource #2A, the terminal device A initiates, based on the cell handover information of the terminal device A, the random access for cell handover. For example, the terminal device A sends a random access signal to a target cell, where the target cell is a cell indicated by the cell handover information. After receiving the cell handover information of the terminal device B on the resource #2B, the terminal device B initiates, based on the cell handover information of the terminal device B, the random access for cell handover. The terminal device A and the terminal device B may be handed over to a same cell or different cells. This is not limited in this application.

By way of an example but not a limitation, the information D may further include the information element B, and the information element B indicates a handover condition of the corresponding terminal device. In other words, the information element B indicates a cell handover initiation condition of the corresponding terminal device. The cell handover initiation condition may be a condition for sending a random access signal for cell handover to the network device #2 by the terminal device. However, this application is not limited thereto. The handover condition may include but is not limited to one or more of the following:
- a time condition, where the time condition indicates a time point at which the terminal device initiates the handover;
- a location condition, where the location condition indicates a location at which the terminal device initiates the handover: or
- a first threshold, where the first threshold indicates a threshold that needs to be met by signal strength of the cell to which the terminal device is to be handed over, and for example, the terminal device initiates the handover when the signal strength of the cell of the network device #2 is greater than or equal to the first threshold.

For a specific implementation of the information element B, refer to the descriptions in FIG. 3. For brevity, details are not described herein again.

Optionally, the information D may further include handover information of a plurality of target cells. For example, the information D may include information about the cell of the network device #2 and a handover condition for handing over to the cell, and may further include information about a cell of a network device #3 and a handover condition for handing over to the cell. When the terminal device meets a handover condition of one cell, the terminal device initiates handover, to hand over to the cell that meets the handover condition.

By way of an example but not a limitation, the information C and/or the information D is handover commands/a handover command.

Optionally, the information C and/or the information D may further include but is not limited to one or more of the following:
an identifier of the cell (namely, a target cell to which the terminal device A and the terminal device B are handed over) of the network device #2, a group of random access resources, a correspondence between a random access resource and a synchronization message block (synchronization signal block, SSB), channel state information reference signal (CSI-RS) configuration information, or system information of the target cell.

S470: The terminal device A initiates the handover to the cell of the network device #2 based on the cell handover information, and/or the terminal device B initiates the handover to the cell of the network device #2 based on the cell handover information.

For example, the terminal device sends the random access signal to the cell of the network device #2, and the random access signal is for handing over to the cell of the network device #2.

In an implementation, after receiving the cell handover information, the terminal devices/terminal device (the terminal device A and/or the terminal device B) initiate/initiates the handover to the cell of the network device #2.

In another implementation, the cell handover information includes the handover condition. After determining that the handover condition of the cell of the network device #2 is met, the terminal devices/terminal device (the terminal device A and/or the terminal device B) initiate/initiates the handover to the cell of the network device #2.

Optionally, after completing a random access process, the terminal device sends an RRC reconfiguration complete message to the network device #2, and the terminal device completes the handover from the cell (the source cell) of the network device #1 to the cell (the target cell) of the network device #2. However, this application is not limited thereto.

Figure 5A:
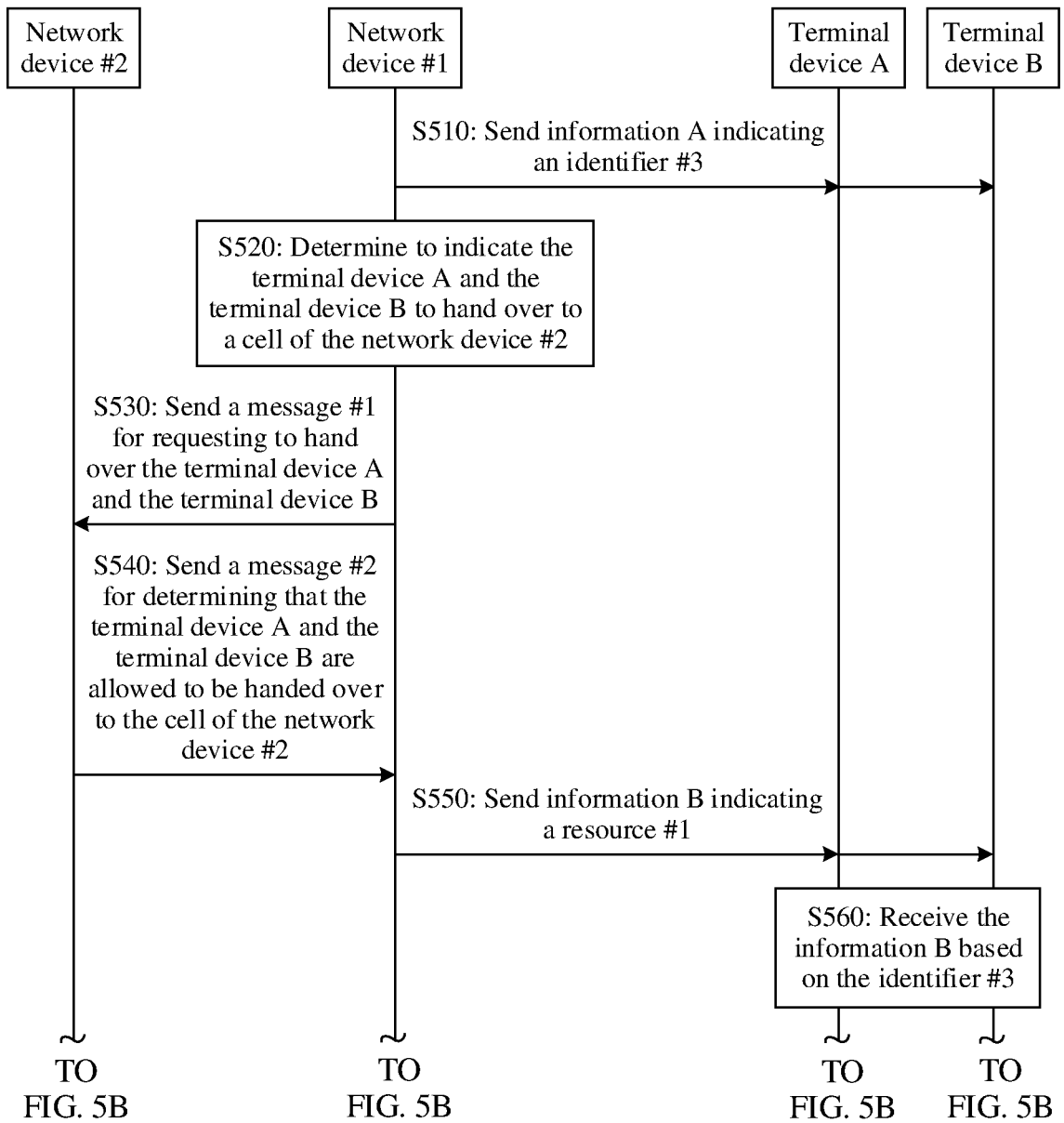
FIG. 5A and FIG. 5B is still another schematic flowchart of a group handover method according to an embodiment of this application.
Figure 5B:
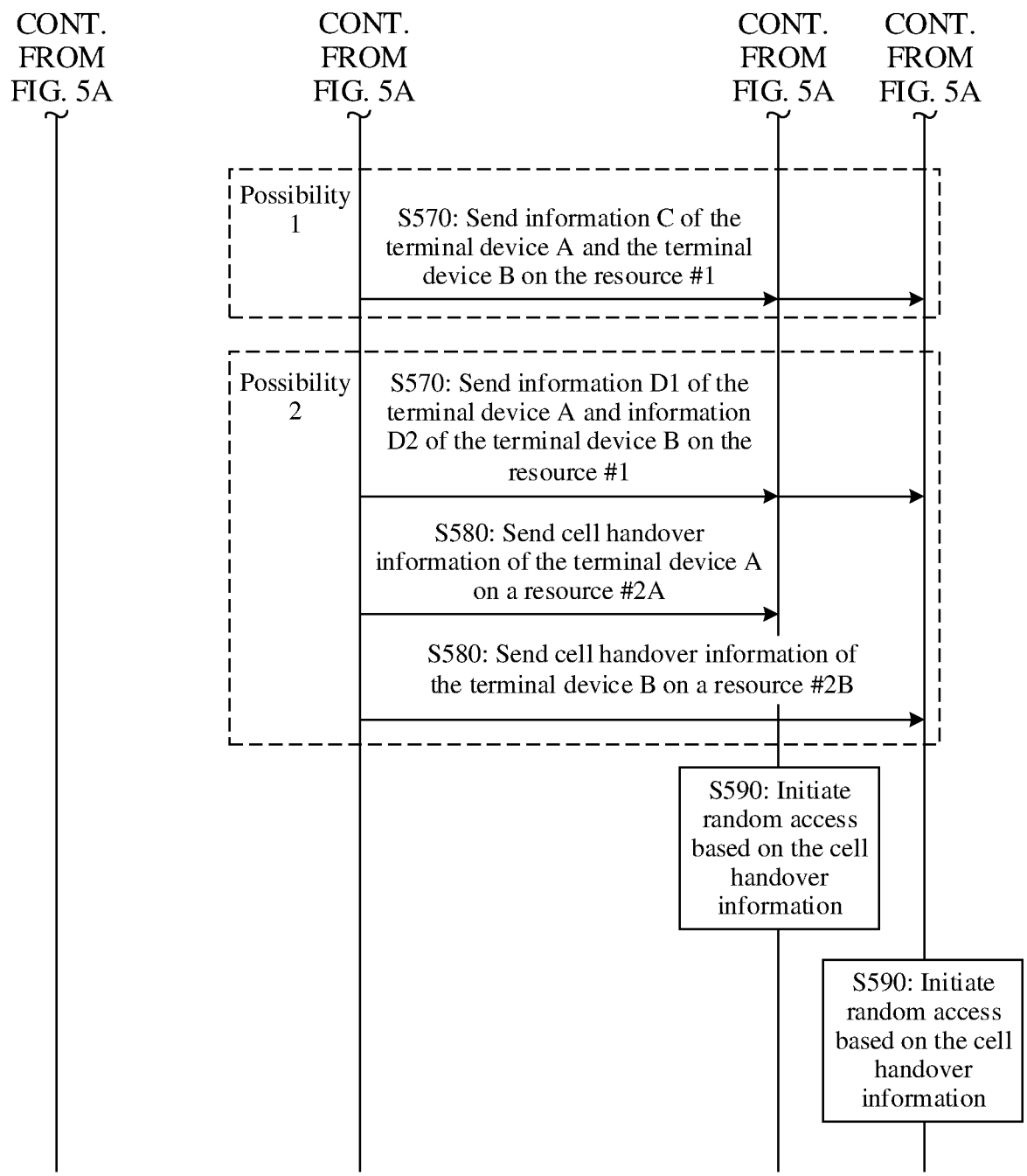

In an implementation of this application, the embodiment shown in FIG. 4 and the embodiment shown in FIG. 3 may be implemented separately, or may be implemented in combination. For example, when the embodiment shown in FIG. 4 and the embodiment shown in FIG. 3 are implemented in combination, after the network device #1 determines that the network device #2 allows the terminal device A and the terminal device B to be handed over to the cell of the network device #2, the network device #1 may indicate the terminal device A and the terminal device B to be handed over to the cell of the network device #2, for example, as shown in FIG. 5A and FIG. 5B. In the embodiment shown in FIG. 5A and FIG. 5B, for parts that are the same as or similar to those in the embodiment in FIG. 4 and the embodiment in FIG. 3, refer to the foregoing descriptions of FIG. 3 and FIG. 4. For brevity, details are not described herein again.

It should be noted that in a specific implementation, some steps in FIG. 3, FIG. 4, or FIG. 5A and FIG. 5B may be selected for implementation, or a sequence of the steps in the figure may be adjusted for implementation. This is not limited in this application. For example, S510 may be performed before S550, or may be performed after S520 or S540. It should be understood that performing some steps in the figure or adjusting a sequence of the steps for specific implementation falls within the protection scope of this application.

The methods provided in embodiments of this application are described above in detail with reference to FIG. 3 to FIG. 5A and FIG. 5B. Apparatuses provided in embodiments of this application are described below in detail with reference to FIG. 6 to FIG. 8.

Figure 6:
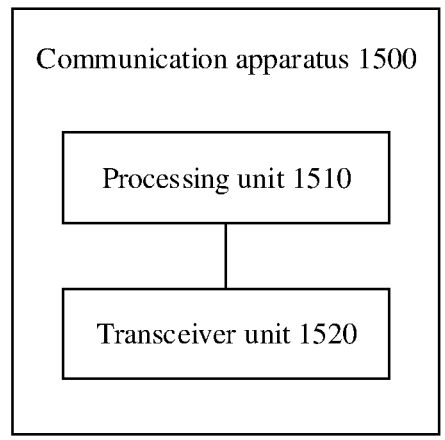
FIG. 6 is a schematic block diagram of an example of a communication apparatus according to this application.

FIG. 6 is a schematic block diagram of a communication apparatus according to an embodiment of this application. As shown in FIG. 6, the communication apparatus 1500 may include a processing unit 1510 and a transceiver unit 1520.

In a possible design, the communication apparatus 1500 may correspond to the terminal device in the foregoing method embodiments, for example, may be a terminal device A or a terminal device B, or may be a chip configured (or used) in the terminal device A or the terminal device B.

It should be understood that the communication apparatus 1500 may correspond to the terminal device in the methods 400 and 500 according to the embodiments of this application, and the communication apparatus 1500 may include units configured to perform the methods performed by the terminal device in the method 400 in FIG. 4 and the method 500 in FIG. 5A and FIG. 5B. In addition, the units in the communication apparatus 1500 and the foregoing other operations and/or functions are respectively used to implement corresponding procedures in the method 400 in FIG. 4 and the method 500 in FIG. 5A and FIG. 5B.

When the communication apparatus 1500 is configured to perform the method 400 in FIG. 4, the transceiver unit 1520 may be configured to perform S410, S430, S450, and S460 in the method 400, and the processing unit 1510 may be configured to perform S440 and S470 in the method 400. When the communication apparatus 1500 is configured to perform the method 500 in FIG. 5A and FIG. 5B, the transceiver unit 1520 may be configured to perform S510, S550, S570, and S580 in the method 500, and the processing unit 1510 may be configured to perform S560 and S590 in the method 500. It should be understood that a specific process of performing a corresponding step by each unit has been described in detail in the foregoing method embodiments. For brevity, details are not described herein again.

It should be further understood that when the communication apparatus 1500 is the chip configured (or used) in the terminal device, the transceiver unit 1520 in the communication apparatus 1500 may be an input/output interface or circuit in the chip, and the processing unit 1510 in the communication apparatus 1500 may be a processor in the chip.

Optionally, the communication apparatus 1500 may further include a processing unit 1510. The processing unit 1510 may be configured to process instructions or data, to implement a corresponding operation.

Optionally, the communication apparatus 1500 may further include a storage unit. The storage unit may be configured to store instructions or data. The processing unit 1510 may execute the instructions or the data stored in the storage unit, to enable the communication apparatus to implement a corresponding operation. The transceiver unit 1520 in the communication apparatus 1500 may correspond to a transceiver 1610 in a terminal device 1600 shown in FIG. 7. The storage unit may correspond to a memory in the terminal device 1600 shown in FIG. 7.

It should be understood that a specific process of performing a corresponding step by each unit has been described in detail in the foregoing method embodiments. For brevity, details are not described herein again.

Figure 7:
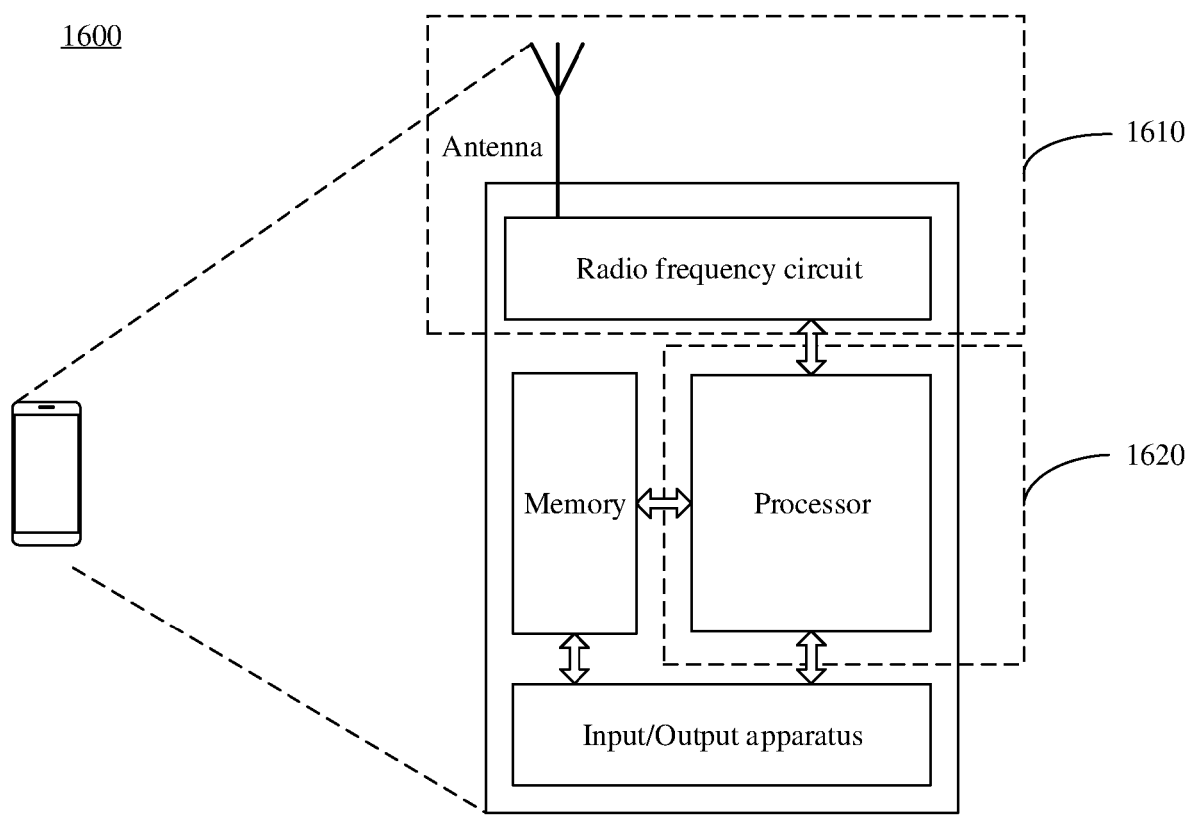
FIG. 7 is a schematic diagram of a structure of an example of a terminal device according to this application.

It should be further understood that when the communication apparatus 1500 is the terminal device, the transceiver unit 1520 in the communication apparatus 1500 may be implemented by using a communication interface (for example, a transceiver or an input/output interface), for example, may correspond to a transceiver 1610 in a terminal device 1600 shown in FIG. 7, and the processing unit 1510 in the communication apparatus 1500 may be implemented by using at least one processor, for example, may correspond to a processor 1620 in the terminal device 1600 shown in FIG. 7, or the processing unit 1510 in the communication apparatus 1500 may be implemented by using at least one logical circuit.

In another possible design, the communication apparatus 1500 may correspond to the network device #1 in the foregoing method embodiments, for example, may be the network device #1 or a chip configured (or used) in the network device #1.

It should be understood that the communication apparatus 1500 may correspond to the network device in the methods 300, 400, and 500 according to the embodiments of this application, and the communication apparatus 1500 may include units configured to perform the methods performed by the network device in the method 300 in FIG. 3, the method 400 in FIG. 4, and the method 500 in FIG. 5A and FIG. 5B. In addition, the units in the communication apparatus 1500 and the foregoing other operations and/or functions are respectively used to implement corresponding procedures in the method 300 in FIG. 3, the method 400 in FIG. 4, and the method 500 in FIG. 5A and FIG. 5B.

When the communication apparatus 1500 is configured to perform the method 300 in FIG. 3, the transceiver unit 1520 may be configured to perform S320 and S330 in the method 300, and the processing unit 1510 may be configured to perform S310 in the method 300. When the communication apparatus 1500 is configured to perform the method 400 in FIG. 4, the transceiver unit 1520 may be configured to perform S410, S430, S450, and S460 in the method 400, and the processing unit 1510 may be configured to perform S420 in the method 400. When the communication apparatus 1500 is configured to perform the method 500 in FIG. 5A and FIG. 5B, the transceiver unit 1520 may be configured to perform S510, S550, S570, and S580 in the method 500, and the processing unit 1510 may be configured to perform S520 in the method 500. It should be understood that a specific process of performing a corresponding step by each unit has been described in detail in the foregoing method embodiments. For brevity, details are not described herein again.

It should be further understood that when the communication apparatus 1500 is the chip configured (or used) in the network device #1, the transceiver unit in the communication apparatus 1500 is an input/output interface or circuit in the chip, and the processing unit 1510 in the communication apparatus 1500 may be a processor in the chip.

Optionally, the communication apparatus 1500 may further include a processing unit 1510. The processing unit 1510 may be configured to process instructions or data, to implement a corresponding operation.

Optionally, the communication apparatus 1500 may further include a storage unit. The storage unit may be configured to store instructions or data. The processing unit may execute the instructions or the data stored in the storage unit, to enable the communication apparatus to implement a corresponding operation. The storage unit in the communication apparatus 1500 may correspond to a memory in a network device 1700 shown in FIG. 8.

It should be understood that a specific process of performing a corresponding step by each unit has been described in detail in the foregoing method embodiments. For brevity, details are not described herein again.

Figure 8:
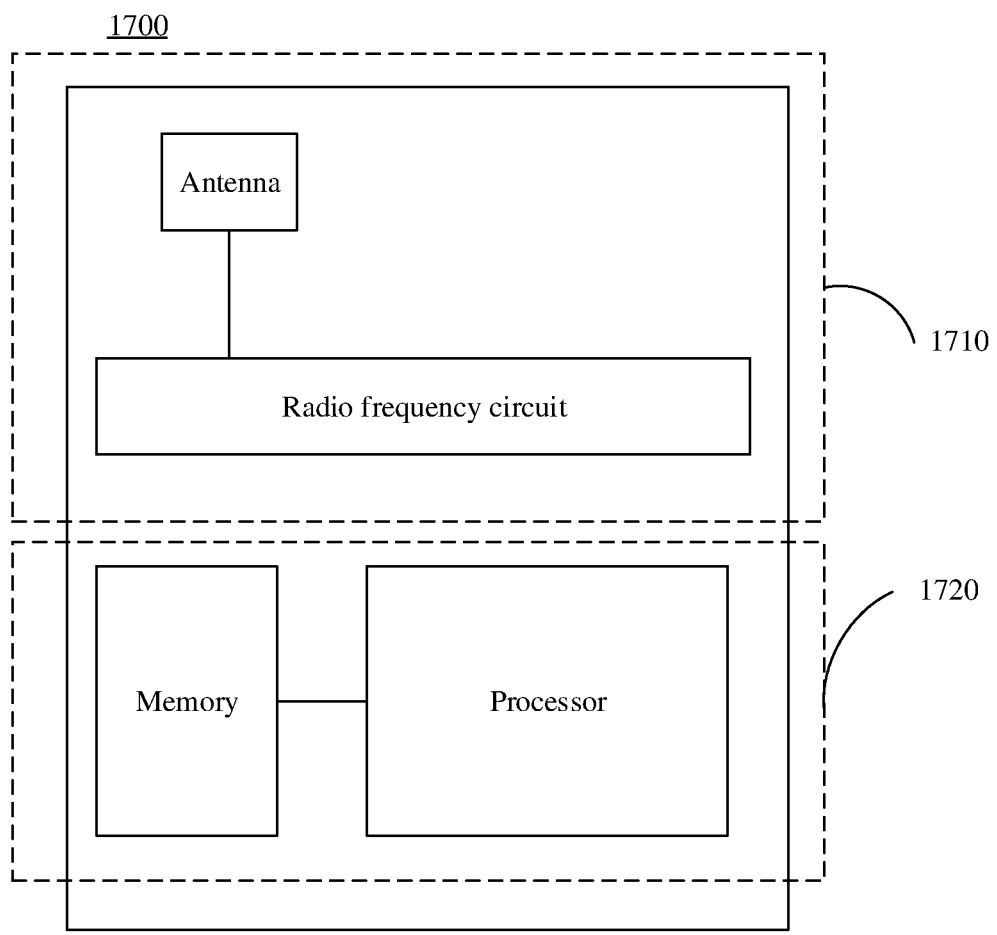
FIG. 8 is a schematic diagram of a structure of an example of a network device according to this application.

It should be further understood that when the communication apparatus 1500 is the network device #1, the transceiver unit 1520 in the communication apparatus 1500 may be implemented by using a communication interface (for example, a transceiver or an input/output interface), for example, may correspond to a transceiver 1710 in a network device 1700 shown in FIG. 8, and the processing unit 1510 in the communication apparatus 1500 may be implemented by using at least one processor, for example, may correspond to a processor 1720 in the network device 1700 shown in FIG. 8, or the processing unit 1510 in the communication apparatus 1500 may be implemented by using at least one logic circuit.

In another possible design, the communication apparatus 1500 may correspond to the network device #2 in the foregoing method embodiments, for example, may be the network device #2 or a chip configured (or used) in the network device #2.

It should be understood that the communication apparatus 1500 may correspond to the network device in the methods 300 and 500 according to the embodiments of this application, and the communication apparatus 1500 may include units configured to perform the methods performed by the network device in the method 300 in FIG. 3 and the method 500 in FIG. 5A and FIG. 5B. In addition, the units in the communication apparatus 1500 and the foregoing other operations and/or functions are respectively used to implement corresponding procedures in the method 300 in FIG. 3 and the method 500 in FIG. 5A and FIG. 5B.

When the communication apparatus 1500 is configured to perform the method 300 in FIG. 3, the transceiver unit 1520 may be configured to perform S320 and S330 in the method 300. When the communication apparatus 1500 is configured to perform the method 500 in FIG. 5A and FIG. 5B, the transceiver unit 1520 may be configured to perform S530 and S540 in the method 500. It should be understood that a specific process of performing a corresponding step by each unit has been described in detail in the foregoing method embodiments. For brevity, details are not described herein again.

It should be further understood that when the communication apparatus 1500 is the chip configured (or used) in the network device #2, the transceiver unit in the communication apparatus 1500 is an input/output interface or circuit in the chip, and the processing unit 1510 in the communication apparatus 1500 may be a processor in the chip.

Optionally, the communication apparatus 1500 may further include a processing unit 1510. The processing unit 1510 may be configured to process instructions or data, to implement a corresponding operation.

Optionally, the communication apparatus 1500 may further include a storage unit. The storage unit may be configured to store instructions or data. The processing unit may execute the instructions or the data stored in the storage unit, to enable the communication apparatus to implement a corresponding operation. The storage unit in the communication apparatus 1500 may correspond to a memory in a network device 1700 shown in FIG. 8.

It should be understood that a specific process of performing a corresponding step by each unit has been described in detail in the foregoing method embodiments. For brevity, details are not described herein again.

It should be further understood that when the communication apparatus 1500 is the network device #2, the transceiver unit 1520 in the communication apparatus 1500 may be implemented by using a communication interface (for example, a transceiver or an input/output interface), for example, may correspond to a transceiver 1710 in the network device 1700 shown in FIG. 8, and the processing unit 1510 in the communication apparatus 1500 may be implemented by using at least one processor, for example, may correspond to a processor 1720 in the network device 1700 shown in FIG. 8, or the processing unit 1510 in the communication apparatus 1500 may be implemented by using at least one logic circuit.

FIG. 7 is a schematic diagram of a structure of a terminal device 1600 according to an embodiment of this application. The terminal device 1600 may be used in the systems shown in FIG. 1 and FIG. 2, to perform functions of the terminal device in the foregoing method embodiments. As shown in the figure, the terminal device 1600 includes a processor 1620 and a transceiver 1610. Optionally, the terminal device 1600 further includes a memory. The processor 1620, the transceiver 1610, and the memory may communicate with each other through an internal connection path, to transfer a control signal and/or a data signal. The memory is configured to store a computer program. The processor 1620 is configured to execute the computer program in the memory, to control the transceiver 1610 to receive and send a signal.

The processor 1620 and the memory may be integrated into a processing apparatus, and the processor 1620 is configured to execute program code stored in the memory to implement the foregoing functions. During specific implementation, the memory may be integrated into the processor 1620, or independent of the processor 1620. The processor 1620 may correspond to the processing unit in FIG. 6.

The transceiver 1610 may correspond to the transceiver unit in FIG. 6. The transceiver 1610 may include a receiver (or referred to as a receiver circuit) and a transmitter (or referred to as a transmitter or a transmitter circuit). The receiver is configured to receive a signal, and the transmitter is configured to transmit a signal.

It should be understood that the terminal device 1600 shown in FIG. 7 can implement the processes of the terminal device in the method embodiments shown in FIG. 4 and FIG. 5A and FIG. 5B. Operations and/or functions of the modules in the terminal device 1600 are used to implement the corresponding procedures in the foregoing method embodiments. For details, refer to the descriptions in the foregoing method embodiments. To avoid repetition, detailed descriptions are properly omitted herein.

The processor 1620 may be configured to perform an action that is implemented inside the terminal device and that is described in the foregoing method embodiments. The transceiver 1610 may be configured to perform a sending action by the terminal device for the network device or a receiving operation from the network device in the foregoing method embodiments. For details, refer to the descriptions in the foregoing method embodiments. Details are not described herein.

Optionally, the terminal device 1600 may further include a power supply, configured to supply power to various components or circuits in the terminal device.

In addition, to improve the functions of the terminal device, the terminal device 1600 may further include one or more of an input unit, a display unit, an audio circuit, a camera, a sensor, and the like, and the audio circuit may further include a speaker, a microphone, and the like.

FIG. 8 is a schematic diagram of a structure of a network device 1700 according to an embodiment of this application. The network device 1700 may be used in the systems shown in FIG. 1 and FIG. 2, to perform functions of the network device in the foregoing method embodiments. For example, FIG. 8 may be a schematic diagram of a related structure of the network device. For example, the network device 1700 may be the base station in FIG. 1 or the satellite in FIG. 2. However, this application is not limited thereto.

It should be understood that the network device 1700 shown in FIG. 8 can implement the processes of the network device in the method embodiments shown in FIG. 3, FIG. 4, and FIG. 5A and FIG. 5B. Operations and/or functions of modules in the network device 1700 are used to implement corresponding procedures in the foregoing method embodiments. For details, refer to the descriptions in the foregoing method embodiments. To avoid repetition, detailed descriptions are properly omitted herein.

It should be understood that, the network device 1700 shown in FIG. 8 is merely a possible architecture of the network device, and this shall not constitute any limitation on this application. The method provided in this application is applicable to a network device in another architecture, for example, a network device including a CU, a DU, and an AAU. A specific architecture of the network device is not limited in this application.

An embodiment of this application further provides a processing apparatus, including a processor and an interface. The processor is configured to perform the method according to any one of the foregoing method embodiments.

It should be understood that the processing apparatus may be one or more chips. For example, the processing apparatus may be a field programmable gate array (FPGA), an application-specific integrated circuit (ASIC), a system on chip (SoC), a central processing unit (CPU), a network processor (NP), a digital signal processing circuit (digital signal processor, DSP), a microcontroller (micro controller unit, MCU), a programmable logic device (PLD), or another integrated chip.

In an implementation process, the steps in the foregoing method may be completed by using a hardware integrated logical circuit in the processor, or by using instructions in a form of software. The steps of the method disclosed with reference to embodiments of this application may be directly performed and completed by a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the method in combination with hardware of the processor. To avoid repetition, details are not described herein again.

It should be noted that the processor in embodiments of this application may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and the logical block diagrams that are disclosed in embodiments of this application. The general-purpose processor may be a microprocessor, or any conventional processor, or the like. The steps of the method disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the method in combination with hardware of the processor.

It may be understood that, in embodiments of this application, the memory may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of an example but not a limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and the method described in this specification is intended to include, but not limited to, these memories and any memory of another proper type.

According to the methods provided in embodiments of this application, this application further provides a computer program product. The computer program product includes computer program code. When the computer program code is executed by one or more processors, an apparatus including the processor is enabled to perform the methods in the embodiments shown in FIG. 3, FIG. 4, and FIG. 5A and FIG. 5B.

According to the methods provided in embodiments of this application, this application further provides a computer-readable storage medium. The computer-readable storage medium stores program code. When the program code is run by one or more processors, an apparatus including the processor is enabled to perform the methods in the embodiments shown in FIG. 3, FIG. 4, and FIG. 5A and FIG. 5B.

According to the methods provided in embodiments of this application, this application further provides a system, including the foregoing one or more network devices. The system may further include the foregoing one or more terminal devices.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step may be performed by the processing unit (the processor). For a function of a specific unit, refer to a corresponding method embodiment. There may be one or more processors.

All or some of embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step may be performed by the processing unit (the processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system and/or a distributed system, and/or across a network such as the internet interacting with other systems by using the signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, unit division is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units may be integrated into one unit.

In the foregoing embodiments, all or some of functions of function units may be implemented by using software, hardware, firmware, or any combination thereof. When software is used to implement embodiments, all or some of embodiments may be implemented in a form of a computer program product. The computer program product includes one or more computer instructions (programs). When the computer program instructions (programs) are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in a form of a software function unit and sold or used as an independent product, the functions may be stored in a computer-readable storage medium. Based on this understanding, the technical solutions of this application essentially, or the part contributing to the prior art, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus for group handover, comprising:
a transceiver, configured to receive first information from a first network device, wherein the first information indicates a first resource for carrying fourth information, the fourth information is cell handover information of a plurality of terminal devices, and the apparatus is configured in a first terminal device in the plurality of terminal devices; and a processor, configured to determine the first resource based on the first information,
wherein the fourth information comprises a plurality of second identifiers corresponding to the plurality of terminal devices, and each of the plurality of second identifiers is an identifier of a corresponding terminal device in a cell of a second network device, and
wherein the fourth information further comprises a plurality of first identifiers corresponding to the plurality of second identifiers, the plurality of second identifiers correspond to the plurality of terminal devices by using the plurality of first identifiers, and each of the plurality of first identifiers is an identifier of a terminal device in a cell of the first network device.

2. The apparatus according to claim 1, wherein the first information is carried on a downlink control channel, and/or the fourth information is carried on a downlink shared channel.

3. The apparatus according to claim 1, wherein the fourth information is encrypted by using encryption information, and the plurality of terminal devices uses the encryption information to detect the fourth information; and the processor is further configured to detect the fourth information based on the encryption information.

4. The apparatus according to claim 1, wherein the fourth information comprises common information and/or a plurality of pieces of dedicated information, the common information is cell handover information that is common to the plurality of terminal devices, the plurality of pieces of dedicated information correspond to the plurality of terminal devices, and each piece of the plurality of pieces of dedicated information is cell handover information that is dedicated to the corresponding terminal device in the plurality of terminal devices.

5. The apparatus according to claim 1, wherein the plurality of second identifiers is arranged in a preset order in the fourth information.

6. The apparatus according to claim 5, wherein the processor is further configured to determine a second identifier of the first terminal device in the plurality of second identifiers based on the preset order.

7. The apparatus according to claim 1, wherein the processor is further configured to determine a second identifier of the first terminal device, wherein the second identifier of the first terminal device is in the plurality of second identifiers and corresponds to a first identifier of the first terminal device.

8. The apparatus according to claim 1, wherein the fourth information comprises a first value, and the processor is further configured to obtain a second identifier of the first terminal device based on the first value.

9. A communication apparatus for group handover, comprising:
a transceiver, configured to receive first information from a first network device, wherein the first information indicates a first resource for carrying a plurality of pieces of second information, the plurality of pieces of second information correspond to a plurality of terminal devices, each piece of the plurality of pieces of second information indicates a second resource that carries third information of the corresponding terminal device in the plurality of terminal devices, the third information is cell handover information, and the communication apparatus is configured in a first terminal device in the plurality of terminal devices; and a processor, configured to determine a second resource based on a piece of second information corresponding to the first terminal device, wherein the first resource is for carrying fourth information, the fourth information comprises a plurality of second identifiers corresponding to the plurality of terminal devices, and each of the plurality of second identifiers is an identifier of a corresponding terminal device in a cell of a second network device, and wherein the fourth information further comprises a plurality of first identifiers corresponding to the plurality of second identifiers, the plurality of second identifiers correspond to the plurality of terminal devices by using the plurality of first identifiers, and each of the plurality of first identifiers is an identifier of a terminal device in a cell of the first network device.

10. The communication apparatus according to claim 9, wherein the first information is carried on a downlink control channel, the plurality of pieces of second information are carried on a downlink shared channel, or the third information is carried on a downlink shared channel.

11. The communication apparatus according to claim 9, wherein the plurality of terminal devices belongs to a first terminal device group, and the first information comprises an identifier of the first terminal device group.

12. The communication apparatus according to claim 11, wherein the identifier of the first terminal device group is a scrambling code sequence of information bits in the first information, or the identifier of the first terminal device group is carried in one indication field in the first information.

13. The communication apparatus according to claim 9, wherein the cell handover information comprises a handover condition, and each terminal device in the plurality of terminal devices uses the handover condition to determine whether to perform cell handover.

14. The communication apparatus according to claim 13, wherein the handover condition comprises one or more of:
- a time condition, wherein the time condition indicates a time point at which the terminal device initiates the cell handover;
- a location condition, wherein the location condition indicates a location at which the terminal device initiates the cell handover; or
- a first threshold, wherein the first threshold indicates a threshold that needs to be met by signal strength of a cell to which the terminal device is to be handed over.

15. A group handover method, comprising:

receiving, by a first terminal device, first information from a first network device, wherein the first information indicates a first resource for carrying a plurality of pieces of second information, the plurality of pieces of second information correspond to a plurality of terminal devices, each piece of the plurality of pieces of second information indicates a second resource that carries third information of the corresponding terminal device in the plurality of terminal devices, the third information is cell handover information, and the first terminal device is one of the plurality of terminal devices; and receiving, by the first terminal device, third information on a second resource indicated by a corresponding piece of second information, wherein the first resource is for carrying fourth information, the fourth information comprises a plurality of second identifiers corresponding to the plurality of terminal devices, and each of the plurality of second identifiers is an identifier of a corresponding terminal device in a cell of a second network device, and wherein the fourth information further comprises a plurality of first identifiers corresponding to the plurality of second identifiers, the plurality of second identifiers correspond to the plurality of terminal devices by using the plurality of first identifiers, and each of the plurality of first identifiers is an identifier of a terminal device in a cell of the first network device.

16. The method according to claim 15, wherein the first information is carried on a downlink control channel;

the plurality of pieces of second information are carried on a downlink shared channel; or the third information is carried on a downlink shared channel.

17. The method according to claim 15, wherein the plurality of terminal devices belongs to a first terminal device group, and the first information comprises an identifier of the first terminal device group.

18. The method according to claim 17, wherein the identifier of the first terminal device group is a scrambling code sequence of information bits in the first information, or the identifier of the first terminal device group is carried in one indication field in the first information.

* * * * *

UNITED STATES PATENT AND TRADEMARK OFFICE
CERTIFICATE OF CORRECTION

Page 1 of 1

PATENT NO. : 12,219,405 B2
APPLICATION NO. : 17/886575
DATED : February 4, 2025
INVENTOR(S) : Yedan Wu It is certified that error appears in the above-identified patent and that said Letters Patent is hereby corrected as shown below:

In the Specification

Column 21, Line 11, change "QOS" to --QoS--.

Signed and Sealed this
Fourth Day of March, 2025

Coke Morgan Stewart
*Acting Director of the United States Patent and Trademark Office*